(12) United States Patent
Kondo et al.

(10) Patent No.: US 11,691,667 B2
(45) Date of Patent: Jul. 4, 2023

(54) STEERING DEVICE AND STEERING METHOD

(71) Applicant: JTEKT CORPORATION, Osaka (JP)

(72) Inventors: Yoshio Kondo, Okazaki (JP); Toshiaki Ogata, Okazaki (JP); Fumio Kishida, Toyota (JP); Keishi Nakamura, Okazaki (JP); Hirohide Suzuki, Nisshin (JP)

(73) Assignee: JTEKT CORPORATION, Osaka (JP)

( * ) Notice: Subject to any disclaimer, the term of this patent is extended or adjusted under 35 U.S.C. 154(b) by 393 days.

(21) Appl. No.: 16/997,236

(22) Filed: Aug. 19, 2020

(65) Prior Publication Data

US 2021/0053615 A1 Feb. 25, 2021

(30) Foreign Application Priority Data

Aug. 22, 2019 (JP) .............................. JP2019-152196
May 21, 2020 (JP) .............................. JP2020-089008

(51) Int. Cl.
*B62D 5/04* (2006.01)

(52) U.S. Cl.
CPC ......... *B62D 5/0484* (2013.01); *B62D 5/0421* (2013.01); *B62D 5/0448* (2013.01); *B62D 5/0463* (2013.01); *B62D 5/0487* (2013.01)

(58) Field of Classification Search
CPC ........ B62D 5/001; B62D 5/04; B62D 5/0409; B62D 5/0412; B62D 5/0415;
(Continued)

(56) References Cited

U.S. PATENT DOCUMENTS 8,924,058 B2 12/2014 Jung et al.
11,472,478 B2 10/2022 Shibata et al.
(Continued)

FOREIGN PATENT DOCUMENTS

JP 2006-347209 A 12/2006
WO 2017/060042 A1 4/2017

OTHER PUBLICATIONS

U.S. Appl. No. 16/997,208, filed Aug. 19, 2020 in the name of Kondo et al.
(Continued)

*Primary Examiner* — Christian Chace
*Assistant Examiner* — Jordan S Fei
(74) *Attorney, Agent, or Firm* — Oliff PLC

(57) ABSTRACT

A steering device includes two motors each configured to generate a drive force that steers a steerable wheel of a vehicle and two controllers respectively corresponding to the two motors, each of the two controllers being configured to individually control a corresponding one of the motors. One of the two controllers is a first controller, and the other one of the two controllers is a second controller. The first controller is configured to calculate a command value corresponding to a total torque that should be generated in the two motors. The command value is divided into individual command values using a changeable distribution ratio set for each of the motors, the individual command values respectively corresponding to the motors. The two controllers are configured to respectively supply the motors with current corresponding to the individual command values.

15 Claims, 9 Drawing Sheets

(58) Field of Classification Search
CPC .. B62D 5/0418; B62D 5/0421; B62D 5/0424; B62D 5/0427; B62D 5/0457; B62D 5/046; B62D 5/0463; B62D 5/0481; B62D 5/0484; B62D 5/0487; B62D 5/0493; B62D 5/0436; B60G 2800/963; H02P 5/00; H02P 5/46; H02P 5/48
See application file for complete search history.

(56) References Cited

U.S. PATENT DOCUMENTS

| | | |
|---|---|---|
| 2003/0221896 A1 | 12/2003 | Sasaki et al. |
| 2004/0040778 A1 | 3/2004 | Katou et al. |
| 2009/0091093 A1 | 4/2009 | Urababa et al. |
| 2012/0097470 A1 | 4/2012 | Yamasaki et al. |
| 2013/0030653 A1 | 1/2013 | Soos |
| 2014/0172236 A1 | 6/2014 | Nishikawa et al. |
| 2014/0316641 A1 | 10/2014 | Wu et al. |
| 2017/0120947 A1 | 5/2017 | Kim |
| 2018/0281846 A1* | 10/2018 | Schreiner ............. B62D 5/0463 |
| 2018/0354548 A1 | 12/2018 | Eickholt et al. |
| 2019/0036470 A1* | 1/2019 | Hashimoto ............. H02P 23/08 |
| 2020/0023888 A1* | 1/2020 | Horitake ............... B60R 16/033 |
| 2020/0309566 A1 | 10/2020 | Fujita et al. |
| 2021/0016824 A1 | 1/2021 | Ishige et al. |
| 2022/0194462 A1 | 6/2022 | Sakuma |
| 2022/0205868 A1 | 6/2022 | Fiss et al. |

OTHER PUBLICATIONS

Feb. 15, 2021 Search Report issued in European Patent Application No. 20191339.9.
Nov. 17, 2022 Office Action issued in U.S. Appl. No. 16/997,208.

* cited by examiner

STEERING DEVICE AND STEERING METHOD

BACKGROUND

1. Field

The present disclosure relates to a steering device and a steering method that steer steerable wheels of a vehicle.

2. Description of Related Art

In a typical known steer-by-wire type steering system, the transmission of power between the steering wheel and steerable wheels is mechanically separated. Japanese Laid-Open Patent Publication No. 2006-347209 describes an example of a steering system including two motors arranged coaxially on a steering rod that steers the steerable wheels. The two motors each include a rotor that is arranged integrally with a ball nut. The ball nuts are fastened to ball screw parts on the steering rod by a large number of balls. Rotation of the two motors is converted into linear motion of the steering rod by ball screw mechanisms including the ball nuts.

In the steering system of Japanese Laid-Open Patent Publication No. 2006-347209, one steering rod is operated using two motors. Thus, in order to properly steer the steerable wheels, the two motors need to be controlled in cooperation.

SUMMARY

It is an object of the present disclosure to provide a steering device and a steering method capable of steering steerable wheels more properly.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A steering device according to an aspect of the present disclosure includes two motors each configured to generate a drive force that steers a steerable wheel of a vehicle and two controllers respectively corresponding to the two motors, each of the two controllers being configured to individually control a corresponding one of the motors. One of the two controllers is a first controller, and the other one of the two controllers is a second controller. The first controller is configured to calculate a command value corresponding to a total torque that should be generated in the two motors. The command value is divided into individual command values using a changeable distribution ratio set for each of the motors, the individual command values respectively corresponding to the motors. The two controllers are configured to respectively supply the motors with current corresponding to the individual command values.

A steering method according to an aspect of the present disclosure individually controls two motors each configured to generate a drive force that steers a steerable wheel of a vehicle. The steering method includes calculating a command value corresponding to a total torque that should be generated in the two motors, dividing the command value into individual command values using a changeable distribution ratio set for each of the motors, the individual command values respectively corresponding to the motors, and respectively supplying the motors with current corresponding to the individual command value.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A steering device 10 for a vehicle according to a first embodiment will now be described.

Figure 1:
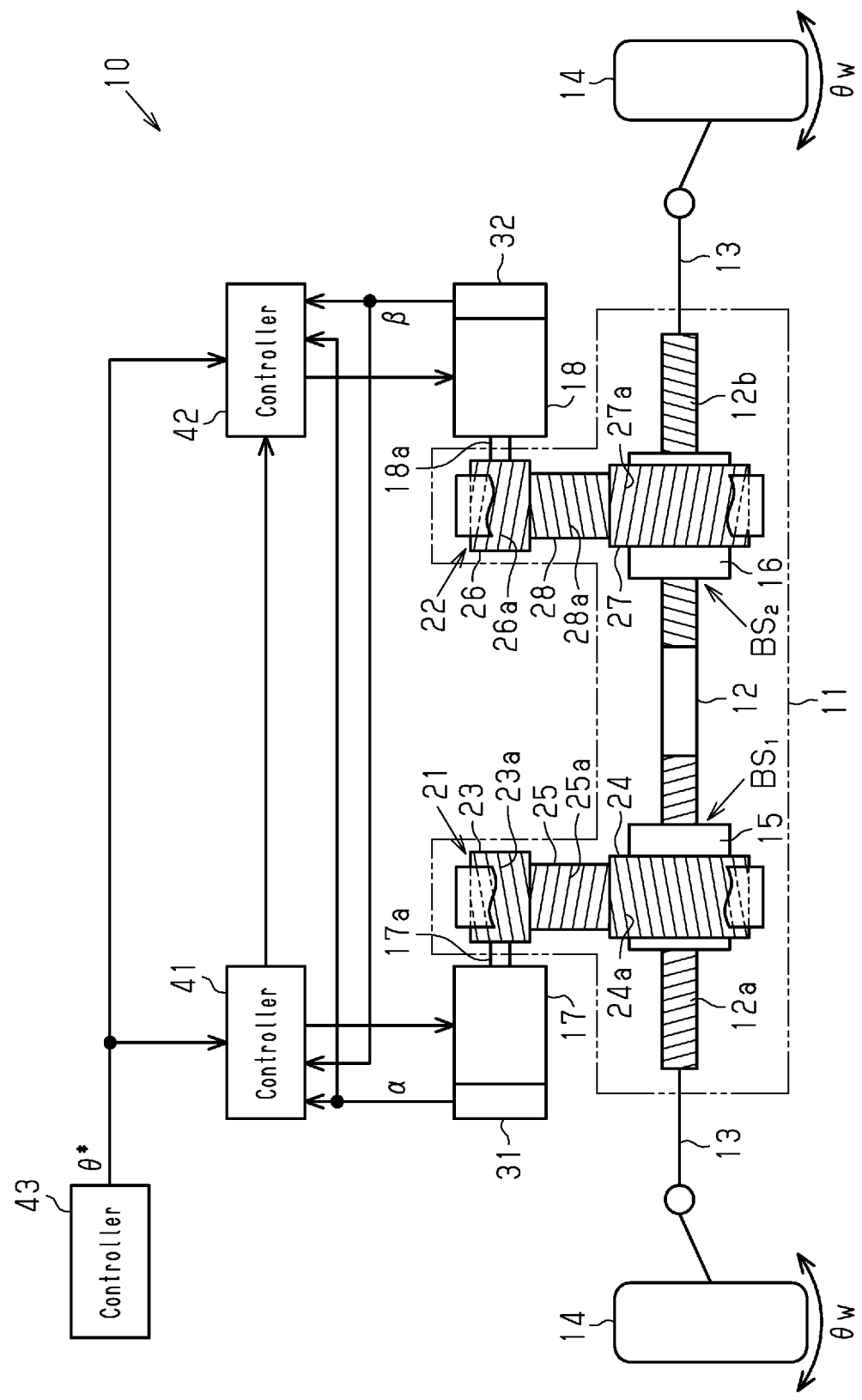
FIG. 1 is a diagram showing the structure of a steering device in a first embodiment.

As shown in FIG. 1, the steering device 10 includes a housing 11, which is fixed to a vehicle body (not shown). The housing 11 accommodates a steering rod 12, which extends in the left-right direction of the vehicle body (left-right direction in FIG. 1). Steerable wheels 14 are coupled to opposite ends of the steering rod 12 by tie rods 13, respectively. Movement of the steering rod 12 in its axial direction changes steerable angles θw of the steerable wheels 14.

The steering rod 12 includes a first ball screw part 12a and a second ball screw part 12b. The first ball screw part 12a is located closer to a first end, which is the left end of the steering rod 12 in FIG. 1. The first ball screw part 12a is provided with a right-hand thread over a predetermined range. The second ball screw part 12b is located closer to a second end, which is the right end of the steering rod 12 in FIG. 1. The second ball screw part 12b is provided with a left-hand thread over a predetermined range.

The steering device 10 includes a first ball nut 15 and a second ball nut 16. The first ball nut 15 is fastened to the first ball screw part 12a of the steering rod 12 by multiple balls (not shown). The second ball nut 16 is fastened to the second ball screw part 12b of the steering rod 12 by multiple balls (not shown). The first ball screw part 12a of the steering rod 12, balls (not shown), and the first ball nut 15 configure a first ball screw $BS_1$. The second ball screw part 12b of the steering rod 12, balls (not shown), and the second ball nut 16 configure a second ball screw $BS_2$.

The steering device 10 includes a first motor 17 and a second motor 18. The first motor 17 and the second motor 18 are generation sources of steering force, which is the power to steer the steerable wheels 14. The first motor 17 and the second motor 18 are, for example, three-phase brushless motors. The first motor 17 and the second motor 18 are fixed to outer portions of the housing 11. The first motor 17 and the second motor 18 respectively include an output shaft 17a and an output shaft 18a, which extend in parallel to the steering rod 12.

The steering device 10 includes a first belt transmission mechanism 21 and a second belt transmission mechanism 22.

The first belt transmission mechanism 21 includes a driving pulley 23, a driven pulley 24, and an endless belt 25. The driving pulley 23 is a toothed pulley. The outer circumferential surface of the driving pulley 23 is provided with teeth 23a. The driving pulley 23 is fixed to the output shaft 17a of the first motor 17. The driven pulley 24 is a toothed pulley. The outer circumferential surface of the driven pulley 24 is provided with teeth 24a. The driven pulley 24 is fitted and fixed to the outer circumferential surface of the first ball nut 15. The belt 25 is a toothed belt. The inner circumferential surface of the belt 25 is provided with teeth 25a. The belt 25 is looped between the driving pulley 23 and the driven pulley 24. Thus, rotation of the first motor 17 is transmitted to the first ball nut 15 through the driving pulley 23, the belt 25, and the driven pulley 24.

In the same manner as the first belt transmission mechanism 21, the second belt transmission mechanism 22 includes a driving pulley 26, a driven pulley 27, and an endless belt 28. The driving pulley 26 is a toothed pulley. The outer circumferential surface of the driving pulley 26 is provided with teeth 26a. The driving pulley 26 is fixed to the output shaft 18a of the second motor 18. The driven pulley 27 is a toothed pulley. The outer circumferential surface of the driven pulley 27 is provided with teeth 27a. The driven pulley 27 is fitted and fixed to the outer circumferential surface of the second ball nut 16. The belt 28 is a toothed belt. The inner circumferential surface of the belt 28 is provided with teeth 28a. The belt 28 is looped between the driving pulley 26 and the driven pulley 27. Thus, rotation of the second motor 18 is transmitted to the second ball nut 16 through the driving pulley 26, the belt 28, and the driven pulley 27.

The first belt transmission mechanism 21 and the first ball screw $BS_1$ configure a first transmission mechanism, which transmits the drive force of the first motor 17 to the steering rod 12. The second belt transmission mechanism 22 and the first ball screw $BS_2$ configure a second transmission mechanism, which transmits the drive force of the second motor 18 to the steering rod 12. The deceleration ratio from the first motor 17 to the steering rod 12 (i.e., the deceleration ratio of the first transmission mechanism) is equal to the deceleration ratio from the second motor 18 to the steering rod 12 (i.e., the deceleration ratio of the second transmission mechanism). The lead of the first ball screw part 12a of the steering rod 12 is equal to the lead of the second ball screw part 12b of the steering rod 12. Thus, the movement amount of the steering rod 12 per rotation of the first motor 17 is equal to the movement amount of the steering rod 12 per rotation of the second motor 18.

The steering device 10 includes a first rotation angle sensor 31 and a second rotation angle sensor 32. The first rotation angle sensor 31 and the second rotation angle sensor 32 are, for example, resolvers. The detection range of the first rotation angle sensor 31 is 360°, which corresponds to a single cycle of the electrical angle of the first motor 17. The detection range of the second rotation angle sensor 32 is 360°, which corresponds to a single cycle of the electrical angle of the second motor 18.

The first rotation angle sensor 31 is arranged in the first motor 17. The first rotation angle sensor 31 detects a rotation angle $\alpha$, which is indicated by the electrical angle of the first motor 17. The first rotation angle sensor 31 generates a first sine signal (sin signal) and a first cosine signal (cos signal). The first sine signal is an electrical signal that changes in a sine waveform in correspondence with the rotation of the first motor 17. The first cosine signal is an electrical signal that changes in a cosine waveform in correspondence with the rotation of the first motor 17. The first rotation angle sensor 31 calculates, as the rotation angle $\alpha$ of the first motor 17, an arctangent that is based on the first sine signal and the first cosine signal. The rotation angle $\alpha$ changes in a sawtooth waveform in a cycle corresponding to an axial double angle of the first rotation angle sensor 31. That is, the rotation angle $\alpha$ changes so as to repeat rise and steep fall in correspondence with the rotation of the first motor 17.

The second rotation angle sensor 32 is arranged in the second motor 18. The second rotation angle sensor 32 detects a rotation angle $\beta$, which is indicated by the electrical angle of the second motor 18. The second rotation angle sensor 32 generates a second sine signal and a second cosine signal. The second sine signal is an electrical signal that changes in a sine waveform in correspondence with the rotation of the second motor 18. The second cosine signal is an electrical signal that changes in a cosine waveform in correspondence with the rotation of the second motor 18. The second rotation angle sensor 32 calculates, as the rotation angle $\beta$ of the second motor 18, an arctangent that is based on the second sine signal and the second cosine signal. The rotation angle $\beta$ changes in a sawtooth waveform in a cycle corresponding to an axial double angle of the second rotation angle sensor 32.

The first rotation angle sensor 31 and the second rotation angle sensor 32 have axial double angles that differ from each other. The axial double angle refers to the ratio of the electrical angle of an electrical signal to the rotation angle indicated by the mechanical angle of the first motor 17 and the second motor 18. For example, when the first rotation angle sensor 31 generates an electrical signal corresponding to a single cycle during a single rotation of the first motor 17, the axial double angle of the first rotation angle sensor 31 is a single angle (1×). When the first rotation angle sensor 31 generates an electrical signal corresponding to four cycles during a single rotation of the first motor 17, the axial double angle of the first rotation angle sensor 31 is a quadruple angle (4×).

The first rotation angle sensor 31 and the second rotation angle sensor 32 have axial double angles that differ from each other. Thus, the number of cycles of the rotation angle α per rotation of the first motor 17 and the number of cycles of the rotation angle β per rotation of the second motor 18 differ from each other. That is, the value of the rotation angle indicated by the mechanical angle of the first motor 17 per cycle of the electrical signal generated by the first rotation angle sensor 31 is different from the value of the rotation angle indicated by the mechanical angle of the second motor 18 per cycle of the electrical signal generated by the second rotation angle sensor 32.

The first motor 17 is coupled to the steering rod 12 and consequently to the steerable wheels 14 by the first belt transmission mechanism 21. The second motor 18 is coupled to the steering rod 12 and consequently to the steerable wheels 14 by the second belt transmission mechanism 22. Thus, each of the rotation angle α of the first motor 17 and the rotation angle β of the second motor 18 is a value on which the absolute position in the axial direction of the steering rod 12 and consequently the steerable angles of the steerable wheels 14 are reflected.

The steering device 10 includes a first controller 41 and a second controller 42. The first controller 41 may be circuitry including: 1) one or more processors that operate according to a computer program (software); 2) one or more dedicated hardware circuits such as application specific integrated circuits (ASICs) that execute at least part of various processes; or 3) a combination thereof. The processor includes a CPU and memories such as a RAM and a ROM. The memories store program codes or commands configured to cause the CPU to execute processes. The memories, or non-transitory computer readable media, include any type of media that are accessible by general-purpose computers and dedicated computers. The second controller 42 and an upper controller 43, which will be described below, have the same configuration as the first controller 41.

The first controller 41 controls the first motor 17. The first controller 41 obtains a target steerable angle θ*. The target steerable angle θ* is calculated by, for example, the onboard upper controller 43 in correspondence with the steering state or traveling state of the vehicle. The upper controller 43 corresponds to an external controller. The first controller 41 obtains the rotation angle α of the first motor 17, which is detected by the first rotation angle sensor 31, and the rotation angle β of the second motor 18, which is detected by the second rotation angle sensor 32.

The first controller 41 executes a steering control that steers the steerable wheels 14 in correspondence with the steering state by driving and controlling the first motor 17. The first controller 41 uses the rotation angle α of the first motor 17, which is detected by the first rotation angle sensor 31, and the rotation angle β of the second motor 18, which is detected by the second rotation angle sensor 32, to calculate an actual absolute position of the steering rod 12. Further, the first controller 41 uses the target steerable angle θ* to calculate a target absolute position of the steering rod 12. The first controller 41 obtains the difference between the target absolute position and the actual absolute position of the steering rod 12 to execute a position feedback control that controls power feeding to the first motor 17 such that the difference is eliminated.

More specifically, the first controller 41 calculates a current command value for the first motor 17 and the second motor 18 in correspondence with the difference between the target absolute position and the actual absolute position of the steering rod 12. The first controller 41 supplies the first motor 17 with the current corresponding to the current command value.

The second controller 42 controls the second motor 18. The second controller 42 executes a steering control that steers the steerable wheels 14 in correspondence with the steering state by driving and controlling the second motor 18. The second controller 42 obtains a current command value calculated by the first controller 41. The second controller 42 uses the current command value to control power feeding to the second motor 18.

The second controller 42 obtains the target steerable angle θ*, which is calculated by the above-described upper controller 43, the rotation angle α of the first motor 17, which is detected by the first rotation angle sensor 31, and the rotation angle β of the second motor 18, which is detected by the second rotation angle sensor 32. The second controller 42 includes first to third functions.

The first function is to calculate an actual absolute position of the steering rod 12 using the rotation angle α of the first motor 17, which is detected by the first rotation angle sensor 31, and the rotation angle β of the second motor 18, which is detected by the second rotation angle sensor 32. The second function is to calculate a target absolute position of the steering rod 12 using the target steerable angle θ*. The third function is to obtain the difference between the target absolute position and the actual absolute position of the steering rod 12 and execute a position feedback control that controls power feeding to the second motor 18 such that the difference is eliminated.

When the first controller 41 is operating normally, the second controller 42 keeps the first to third functions disabled. At this time, the target steerable angle θ*, the rotation angle α of the first motor 17, and the rotation angle β of the second motor 18 are not used.

As the first ball nut 15 and the second ball nut 16 rotate relative to the steering rod 12, the steering rod 12 receives torque acting around the axis of the steering rod 12. The direction of the torque that acts on the steering rod 12 as the first ball nut 15 rotates and the direction of the torque that acts on the steering rod 12 as the second ball nut 16 rotates are opposite directions. When the steering rod 12 attempts to be moved in a specific direction, the operation of the first motor 17 and the second motor 18 is controlled such that the first ball nut 15 and the second ball nut 16 rotate in opposite directions and the magnitude of the torque acting on the steering rod 12 as the first ball nut 15 and the second ball nut 16 rotate becomes the same. Thus, the torque that acts on the steering rod 12 as the first ball nut 15 rotates is counterbalanced by the torque that acts on the steering rod 12 as the second ball nut 16 rotates. This prevents the steering rod 12 from receiving the torque acting around the axis of the steering rod 12.

Controllers

The first controller 41 and the second controller 42 will now be described in detail.

Figure 2:
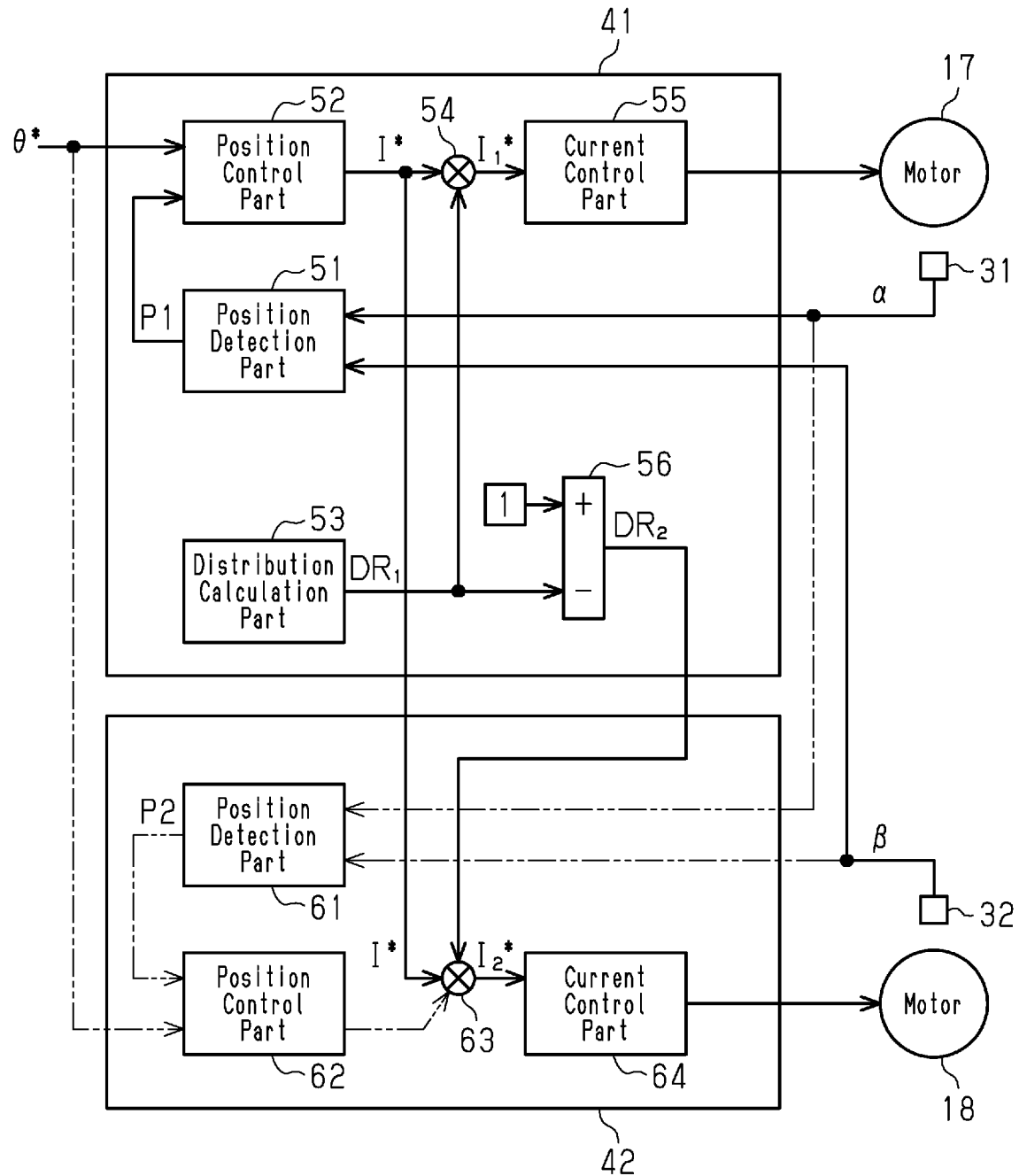
FIG. 2 is a block diagram of the controllers in the first embodiment.

As shown in FIG. 2, the first controller 41 includes a position detection part 51, a position control part 52, a distribution calculation part 53, a multiplier 54, a current control part 55, and a subtractor 56.

The position detection part 51 obtains the rotation angle α of the first motor 17, which is detected by the first rotation angle sensor 31, and the rotation angle β of the second motor 18, which is detected by the second rotation angle sensor 32. The position detection part 51 uses the rotation angle α and β to calculate the absolute position P1 of the steering rod 12.

The axial double angle of the first rotation angle sensor 31 and the axial double angle of the second rotation angle sensor 32 are set such that the rotation angle α, which is detected by the first rotation angle sensor 31, does not match the rotation angle $\beta$, which is detected by the second rotation angle sensor 32, within the maximum movement range of the steering rod 12. Thus, a combination of the value of the rotation angle $\alpha$ and the value of the rotation angle $\beta$ individually corresponds to the absolute position P1 of the steering rod 12. This allows the absolute position P1 of the steering rod 12 to be instantly detected using the combination of the two rotation angles $\alpha$ and $\beta$. The midpoint of the calculation range of the absolute position P1, which is calculated by the position detection part 51, is set as the origin, i.e., a steering neutral position (steerable angle $\theta w=0°$). The steering neutral position is the position of the steering rod 12 when the vehicle is traveling straight.

The position control part 52 calculates the target absolute position of the steering rod 12 using the target steerable angle $\theta^*$, which is calculated by the above-described upper controller 43. Since the steering rod 12 and the steerable wheels 14 move in conjunction with each other, the steering rod 12 correlates with the steerable angles $\theta w$ of the steerable wheels 14. Using the correlation, the target absolute position of the steering rod 12 can be obtained from the target steerable angle $\theta^*$. The position control part 52 obtains the difference between the target absolute position of the steering rod 12 and the actual absolute position P1 of the steering rod 12, which is calculated by the position detection part 51. The position control part 52 calculates a current command value I* for the first motor 17 and the second motor 18 so as to eliminate the difference. The current command value I* is a command value corresponding to the total torque that should be generated in the first motor 17 and the second motor 18. That is, the position control part 52 corresponds to a first processing part.

The distribution calculation part 53 calculates a first distribution ratio $DR_1$ of the current command value I* for the first motor 17, which is calculated by the position control part 52. That is, the distribution calculation part 53 corresponds to a second processing part. The first distribution ratio $DR_1$ is set to be a value within a range greater than or equal to 0 and less than or equal to 1. In the present embodiment, the value of the first distribution ratio $DR_1$ is set to 0.5 in order to counterbalance the torque that acts on the steering rod 12 as the first ball nut 15 rotates and the torque that acts on the steering rod 12 as the second ball nut 16 rotates. This is a value equivalent to 50% when the current command value I* calculated by the position control part 52 is set to 100%.

The multiplier 54 multiplies the first distribution ratio $DR_1$, which is calculated by the distribution calculation part 53, by the current command value I*, which is calculated by the position control part 52, to calculate a first current command value $I_1^*$ for the first motor 17. That is, the multiplier 54 corresponds to a fourth processing part.

The current control part 55 supplies the first motor 17 with the power corresponding to the first current command value $I_1^*$, which is calculated by the multiplier 54. This causes the first motor 17 to generate the torque corresponding to the first current command value $I_1^*$. That is, the current control part 55 corresponds to a fifth processing part.

The subtractor 56 receives 1, which is a fixed value stored in a storage device of the first controller 41. The subtractor 56 subtracts the first distribution ratio $DR_1$, which is calculated by the distribution calculation part 53, from 1, which is a fixed value, to calculate a second distribution ratio $DR_2$ of the current command value I* for the second motor 18. That is, the subtractor 56 corresponds to a third processing part. In the present embodiment, since the first distribution ratio $DR_1$ is set to 0.5, the value of the second distribution ratio $DR_2$ is set to 0.5.

In this manner, the first controller 41 includes the distribution calculation part 53, which calculates the first distribution ratio $DR_1$, and the subtractor 56, which calculates the second distribution ratio $DR_2$. That is, in the present embodiment, the first distribution ratio $DR_1$ and the second distribution ratio $DR_2$ of the current command value I*, which is a command value, are set by the first controller 41.

As shown in FIG. 2, the second controller 42 includes a position detection part 61, a position control part 62, a multiplier 63, and a current control part 64.

The position detection part 61 obtains the rotation angle $\alpha$ of the first motor 17, which is detected by the first rotation angle sensor 31, and the rotation angle $\beta$ of the second motor 18, which is detected by the second rotation angle sensor 32. The position detection part 61 uses the rotation angle $\alpha$ and $\beta$ to calculate the absolute position P2 of the steering rod 12. The position detection part 61 is used for a backup of the first controller 41, and the function of the position detection part 61 is kept disabled in a normal state in which the first controller 41 is operating normally.

The position control part 62 calculates the target absolute position of the steering rod 12 using the target steerable angle $\theta^*$, which is calculated by the above-described upper controller 43. The position control part 62 obtains the difference between the target absolute position of the steering rod 12 and the actual absolute position P2 of the steering rod 12, which is calculated by the position detection part 61. The position control part 62 calculates the current command value I* corresponding to the total torque that should be generated in the first motor 17 and the second motor 18 so as to eliminate the difference. The position control part 62 is used for a backup of the first controller 41, and the function of the position control part 62 is kept disabled in the normal state in which the first controller 41 is operating normally.

The multiplier 63 multiplies the second distribution ratio $DR_2$, which is calculated by the subtractor 56 of the first controller 41, by the current command value I*, which is calculated by the position control part 52 of the first controller 41, to calculate a second current command value $I_2^*$ for the second motor 18. That is, the multiplier 63 corresponds to a sixth processing part.

The current control part 64 supplies the second motor 18 with the power corresponding to the second current command value $I_2^*$, which is calculated by the multiplier 63. This causes the second motor 18 to generate the torque corresponding to the second current command value $I_2^*$. That is, the current control part 64 corresponds to a seventh processing part.

Operation and Advantages of First Embodiment

Accordingly, the first embodiment has the following operation and advantages.

(1) The total current command value I* for the first motor 17 and the second motor 18 is calculated through the feedback control of the absolute position P1 of the steering rod 12 executed by the position control part 52 of the first controller 41. The current command value I* and the first distribution ratio $DR_1$, which is calculated by the distribution calculation part 53, are used to set the first current command value $I_1^*$ for the first motor 17. Further, the current command value I* and the second distribution ratio $DR_2$, which is calculated by the subtractor 56, are used to set the second current command value $I_2^*$ for the second motor 18. The first motor 17 is supplied with the current corresponding to the first current command value $I_1^*$, and the second motor 18 is supplied with the current corresponding to the second current command value $I_2$.

In this manner, when the first motor 17 and the second motor 18 are operating in cooperation, the current supplied to the first motor 17 and the second motor 18 is determined by the first controller 41. The second controller 42 merely operates to supply the second motor 18, which is a target controlled by the second controller 42, with an individual current command value that is based on the second distribution ratio $DR_2$, which is unilaterally determined by the first controller 41 (i.e., with the current corresponding to the second current command value $I_2^*$). That is, the first controller 41 and the second controller 42 have a master/slave relationship. Thus, unlike a case in which, for example, the first controller 41 and the second controller 42 each execute a position control to individually calculate the current command value for a motor serving as a target controlled by the corresponding controller and control, using the individually-calculated current command value, the power feeding to the motor serving as the target controlled by the corresponding controller, the control of the first controller 41 and the control of the second controller 42 are prevented from interfering with each other.

In a specific example, situations are prevented in which the position feedback control of the steering rod 12 by the first controller 41 and the position feedback control of the steering rod 12 by the second controller 42 interfere with each other due to, for example, a lead error between the first ball screw part 12a and the second ball screw part 12b of the steering rod 12. Accordingly, the steerable wheels 14 are steered more properly by the first motor 17 and the second motor 18 operating properly in cooperation.

(2) The steering device 10 includes the first ball screw $BS_1$ and the second ball screw $BS_2$ as an elastic element. While the position feedback control of the steering rod 12 is executed in the first controller 41, the position feedback control of the steering rod 12 is not executed in the second controller 42. Thus, unlike a case where the position feedback control of the steering rod 12 is executed both in the first controller 41 and the second controller 42, the generation of resonance is limited in the steering device 10. This limits the generation of vibration or noise resulting from the steering operation of the steering device 10.

Second Embodiment

A steering device according to a second embodiment will now be described. The present embodiment basically has the same configuration as the first embodiment, which is shown in FIG. 1. Like or the same reference numerals are given to those components that are like or the same as the corresponding components of the first embodiment. Such components will not be described in detail.

In the steering device 10, the first ball screw part 12a of the steering rod 12 and the first ball nut 15, the second ball screw part 12b of the steering rod 12 and the second ball nut 16 may wear or rust over a long period of use. The wear or rust of the first ball screw $BS_1$ and the second ball screw $BS_2$ may result in an excessive increase in the friction when the first ball nut 15 and the second ball nut 16 attempt to rotate relative to the steering rod 12. That is, the wear or rust of the first ball screw $BS_1$ and the second ball screw $BS_2$ lower a motion transmission characteristic of the steering device 10. Accordingly, the positioning accuracy of the steering rod 12 and consequently the motion accuracy of the steering device 10 are affected to no small extent, or the accuracy of the steering operation of the steerable wheels 14 is affected to no small extent.

To solve this problem, in the present embodiment, the first controller 41 and the second controller 42 have the following configurations in order to detect an anomalous friction increase in the first ball screw $BS_1$ or the second ball screw $BS_2$.

Figure 3:
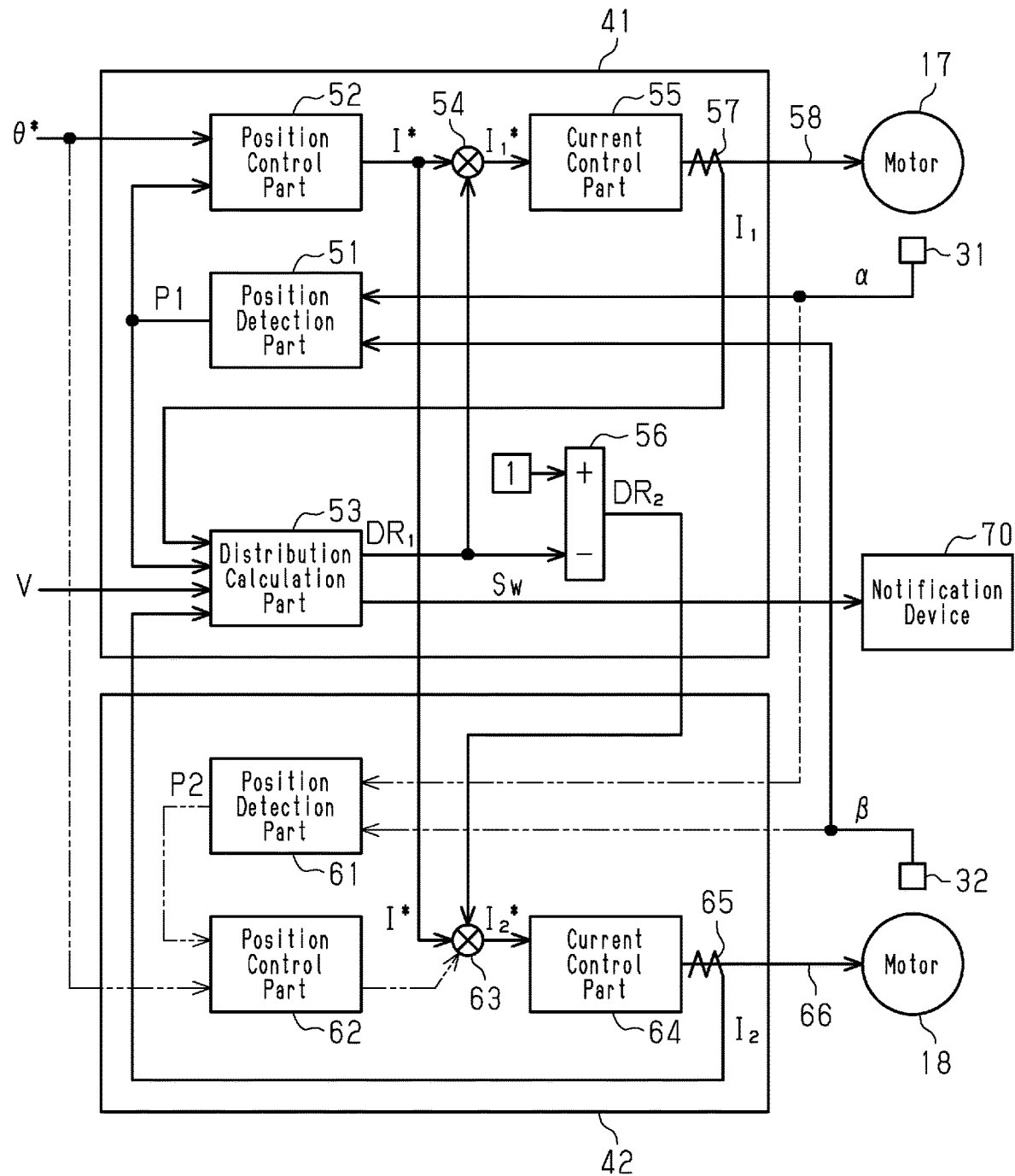
FIG. 3 is a block diagram of the controllers in a second embodiment.

As shown in FIG. 3, the first controller 41 includes a first current sensor 57. The first current sensor 57 is arranged on a power feeding passage 58 between the current control part 55 and the first motor 17. The first current sensor 57 detects a current value $I_1$, which is the value of current supplied from the current control part 55 to the first motor 17. The second controller 42 includes a second current sensor 65. The second current sensor 65 is arranged on a power feeding passage 66 between the current control part 64 and the second motor 18. The second current sensor 65 detects a current value $I_2$, which is the value of current supplied from the current control part 64 to the second motor 18.

The distribution calculation part 53 of the first controller 41 includes an anomaly detection function that detects an anomalous increase (i.e. abnormal increase) in the friction in the first ball screw $BS_1$ or the second ball screw $BS_2$. Upon satisfaction of a preset execution condition, the distribution calculation part 53 starts executing an anomaly detection process. Examples of the execution condition include the following condition (A).

(A) The steering state of the vehicle is a state in which stationary steering is performed. Stationary steering is to operate the steering wheel and consequently steer the steerable wheels 14 when the vehicle is in a stopped state. When stationary steering is performed, the load axial force of the steering rod 12 becomes larger. This causes a friction increase in the first ball screw $BS_1$ or the second ball screw $BS_2$ to be easily reflected on the current values of the first motor 17 and the second motor 18.

In order to determine whether the execution condition of the anomaly detection process has been satisfied, the distribution calculation part 53 obtains the absolute position P1 of the steering rod 12, which is calculated by the position detection part 51, and a vehicle speed V, which is detected by a vehicle speed sensor (not shown) in the vehicle. The distribution calculation part 53 calculates the movement speed of the steering rod 12 by differentiating the absolute position P1 of the steering rod 12, which is acquired by the position detection part 51. The distribution calculation part 53 determines that stationary steering is performed when, for example, the vehicle speed is 0 and the movement speed of the steering rod 12 is not 0.

Further, in order to detect anomalous friction increases in the first ball screw $BS_1$ and the second ball screw $BS_2$, the distribution calculation part 53 obtains the current value $I_1$ of the first motor 17, which is detected by the first current sensor 57, and the current value $I_2$ of the second motor 18, which is detected by the second current sensor 65. The distribution calculation part 53 uses the obtained current values $I_1$ and $I_2$ to detect the anomalous friction increases in the first ball screw $BS_1$ and the second ball screw $BS_2$.

When the friction of the first ball screw $BS_1$ or the second ball screw $BS_2$ increases anomalously, the first ball screw $BS_1$ or the second ball screw $BS_2$ is prevented from smoothly operating. This increases the force needed to operate the first ball screw $BS_1$ or the second ball screw $BS_2$ by an amount corresponding to the anomalous increase in the friction. Thus, the load torque of the first motor 17 and the load torque of the second motor 18 respectively increase in correspondence with the degree of the friction increase in the first motor 17 and the degree of the friction increase in the second motor 18. The load torque refers to the force that attempts to stop the rotation of the output shaft 17a of the first motor 17 and the output shaft 18a of the second motor 18.

The value of current flowing through the first motor 17 and the second motor 18 becomes large in proportion to the magnitude of the load torque (T-I characteristic). Accordingly, anomalous friction increases in the first ball screw $BS_1$ and the second ball screw $BS_2$ can be detected using the current flowing through the first motor 17 and the second motor 18. In detail, q-axis current values of current flowing through the first motor 17 and the second motor 18 are calculated, and the q-axis current values are used to detect anomalies in the first ball screw $BS_1$ and the second ball screw $BS_2$. The anomaly detection process executed by the distribution calculation part 53 will be described in detail later.

When an anomalous friction increase in the first ball screw $BS_1$ or the second ball screw $BS_2$ is detected, the distribution calculation part 53 generates a notification command signal for a notification device 70. The notification device 70 is arranged in, for example, the passenger compartment. The notification command signal Sw is a command for causing the notification device 70 to execute a predetermined notification operation. The notification device 70 executes the notification operation using the notification command signal Sw. Examples of the notification operation include the production of warning sounds and the displaying of a warning on a display in the passenger compartment.

Procedure for Anomaly Detection Process

The procedure for the anomaly detection process executed by the distribution calculation part 53 will now be described with reference to the flowchart of FIG. 4. The processes of the flowchart are executed upon satisfaction of the preset execution condition such as the above-described condition (A). During normal travel of the vehicle when the anomaly detection process is not executed, the first distribution ratio $DR_1$ and the second distribution ratio $DR_2$ are each set to 0.5. This setting is to counterbalance the torque that acts on the steering rod 12 as the first ball nut 15 rotates and the torque that acts on the steering rod 12 as the second ball nut 16 rotates.

Figure 4:
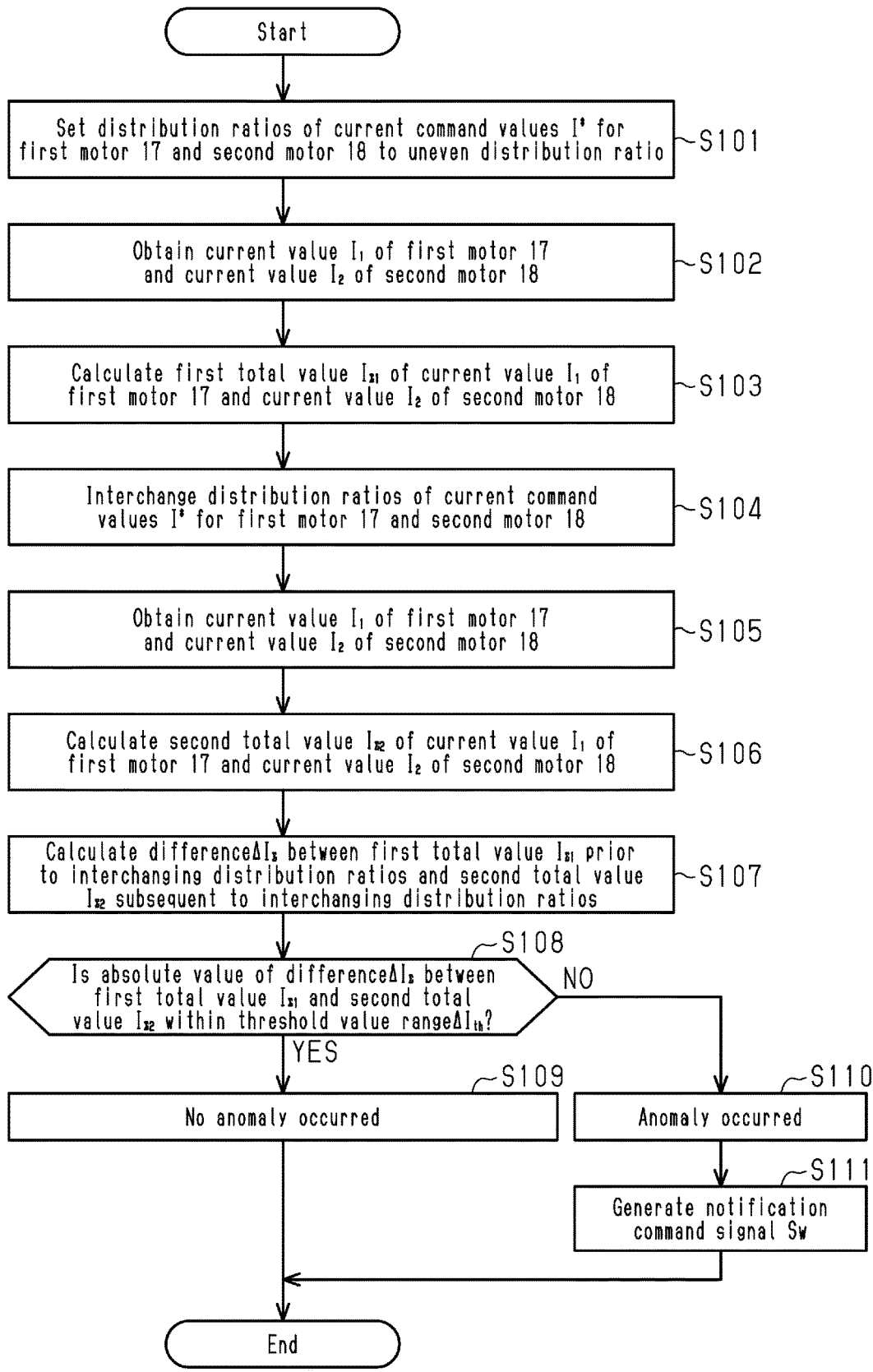
FIG. 4 is a flowchart illustrating the procedure for an anomaly detection process in the second embodiment.

As shown in the flowchart of FIG. 4, the distribution calculation part 53 changes the first distribution ratio $DR_1$ of the current command value I* for the first motor 17 and the second distribution ratio $DR_2$ of the current command value I* for the second motor 18 from an even distribution ratio to an uneven distribution ratio (step S101).

The distribution calculation part 53 sets one of the first distribution ratio $DR_1$ for the first motor 17 and the second distribution ratio $DR_2$ for the second motor 18 to a value exceeding 0.5 and sets the other one to a value less than 0.5. The sum of the first distribution ratio $DR_1$ and the second distribution ratio $DR_2$ is 1. For example, the distribution calculation part 53 changes the first distribution ratio $DR_1$ from 0.5 to 0.7 and changes the second distribution ratio $DR_2$ from 0.5 to 0.3.

Then, the distribution calculation part 53 obtains the current value $I_1$ of the first motor 17, which is detected by the first current sensor 57, and the current value $I_2$ of the second motor 18, which is detected by the second current sensor 65 (step S102). The distribution calculation part 53 calculates a first total value $I_{\Sigma 1}$ of the current values $I_1$ and $I_2$ (step S103). The distribution calculation part 53 temporarily stores the first total value which has been calculated in step S103, in a storage device (not shown).

Subsequently, the distribution calculation part 53 interchanges the value of the first distribution ratio $DR_1$ of the current command value I* for the first motor 17 and the value of the second distribution ratio $DR_2$ of the current command value I* for the second motor 18, which have been set in step S101 (step S104). The distribution calculation part 53 changes the first distribution ratio $DR_1$ for the first motor 17 from 0.7 to 0.3 and changes the second distribution ratio $DR_2$ for the second motor 18 from 0.3 to 0.7.

Next, the distribution calculation part 53 obtains the current value $I_1$ of the first motor 17, which is detected by the first current sensor 57, and the current value $I_2$ of the second motor 18, which is detected by the second current sensor 65 (step S105). The distribution calculation part 53 calculates a second total value $I_{\Sigma 2}$ of the current values $I_1$ and $I_2$ (step S106).

The processes from step S101, which changes the distribution ratio of the current command values I* for the first motor 17 and the second motor 18 to the uneven distribution ratio, to step S106, which calculates the second total value $I_{\Sigma 2}$, are executed within a time or movement distance in which the load axial force of the steering rod 12 resulting from movement of the steering rod 12 is regarded as fixed. To eliminate such imbalance arising from the detection order, the processes of steps S101 to S106 may be repeated by a number of times. In this case, the order of setting to a value exceeding 0.5 or a value less than 0.5 in the first distribution ratio $DR_1$ and the second distribution ratio $DR_2$ may be interchanged alternately.

Then, the distribution calculation part 53 calculates the difference $\Delta I_\Sigma$ between the first total value $I_{\Sigma 1}$, which has been calculated in step S103, and the second total value $I_{\Sigma 2}$, which has been calculated in step S106 (step S107). The distribution calculation part 53 determines whether the absolute value of the difference $\Delta I_\Sigma$ is within a preset threshold value range $\Delta I_{th}$ (step S108).

The threshold value range $\Delta I_{th}$ is set in correspondence with the detection accuracy of friction increases in the first ball screw $BS_1$ and the second ball screw $BS_2$ required for the steering device 10. Each of the upper limit value and the lower limit value that define the threshold value range $\Delta I_{th}$ is set with reference to the difference $\Delta I_\Sigma$ between the first total value $I_{\Sigma 1}$ and the second total value $I_{\Sigma 2}$ in an ideal state in which the first ball screw $BS_1$ and the second ball screw $BS_2$ do not wear.

When determining that the absolute value of the difference $\Delta I_\Sigma$ is within the threshold value range $\Delta I_{th}$ (step S108: YES), that is, when the absolute value of the difference $\Delta I_\Sigma$ is greater than or equal to the lower limit value of the threshold value range $\Delta I_{th}$ and less than or equal to the upper limit value of the threshold value range $\Delta I_{th}$, the distribution calculation part 53 determines that an anomaly has not occurred in the first ball screw $BS_1$ or the second ball screw $BS_2$ (step S109) and ends the process.

By contrast, when determining that the absolute value of the difference $\Delta I_\Sigma$ is not within the threshold value range $\Delta I_{th}$ (step S108: NO), that is, when the absolute value of the difference $\Delta I_\Sigma$ exceeds the upper limit value or falls below the lower limit value, the distribution calculation part 53 determines that anomalies have occurred in the first ball screw $BS_1$ and the second ball screw $BS_2$ (step S110). More specifically, the distribution calculation part 53 determines that the friction of one of the first ball screw $BS_1$ and the second ball screw $BS_2$ has anomalously increased.

Subsequently, the distribution calculation part 53 generates the notification command signal Sw for the notification device 70 (step S111) and ends the process. Upon receipt of the notification command signal Sw, the notification device 70 executes a preset notification operation. The notification operation of the notification device 70 allows the vehicle driver to recognize a ball screw anomaly.

Technical Significance of Uneven Distribution Process

The technical significance of the process that changes the first distribution ratio $DR_1$ and the second distribution ratio $DR_2$ from an even distribution ratio to an uneven distribution ratio executed in step S101 will now be described.

More specifically, the larger the value of the first distribution ratio $DR_1$ becomes, the more easily a friction increase in the first ball screw $BS_1$ affects the current value $I_1$ of the first motor 17. Further, the larger the value of the second distribution ratio $DR_2$ becomes, the more easily a friction increase in the second ball screw $BS_2$ affects the current value $I_2$ of the second motor 18. For example, when the friction of the second ball screw $BS_2$ is hypothetically increasing, the total value of the current value $I_1$ of the first motor 17 and the current value $I_2$ of the second motor 18 is larger when the value of the second distribution ratio $DR_2$ is set to 0.7 than when the value of the second distribution ratio $DR_2$ is set to 0.3. The amount of increase in the total value of the current value $I_1$ of the first motor 17 and the current value $I_2$ of the second motor 18 appears as the difference $\Delta I_\Sigma$ between the first total value $I_{\Sigma 1}$ prior to interchanging the distribution ratios and the second total value $I_{\Sigma 2}$ subsequent to interchanging the distribution ratios. Accordingly, when anomalous friction increases in the first ball screw $BS_1$ and the second ball screw $BS_2$ are detected, it is preferred that the first distribution ratio $DR_1$ and the second distribution ratio $DR_2$ be changed from an even distribution ratio to an uneven distribution ratio.

The first distribution ratio $DR_1$ and the second distribution ratio $DR_2$ each hypothetically remain 0.5, which is a standard operation condition of the steering device 10, without the process of step S101 being executed. In this case, detecting friction increases in the first ball screw $BS_1$ and the second ball screw $BS_2$ may be difficult. The values of the first distribution ratio $DR_1$ and the second distribution ratio $DR_2$ do not change prior to and subsequent to interchanging the distribution ratios. Thus, the total value of current in the first motor 17 and the second motor 18 may not greatly change prior to and subsequent to interchanging the distribution ratios. That is, the friction increases in the first ball screw $BS_1$ and the second ball screw $BS_2$ are not easily reflected as the value of the difference $\Delta I_\Sigma$ between the first total value $I_{\Sigma 1}$ prior to interchanging the distribution ratios and the second total value $I_{\Sigma 2}$ subsequent to interchanging the distribution ratios. Accordingly, when anomalous friction increases in the first ball screw $BS_1$ and the second ball screw $BS_2$ are detected, it is preferred that the first distribution ratio $DR_1$ and the second distribution ratio $DR_2$ be changed from an even distribution ratio to an uneven distribution ratio.

Advantages of Second Embodiment

Accordingly, the second embodiment has the following advantages in addition to the same advantages as advantages (1) to (2) of the first embodiment.

(3) Anomalous friction increases that result from, for example, wear of the first ball screw $BS_1$ and the second ball screw $BS_2$ can be detected using the current value $I_1$ of the first motor 17 and the current value $I_2$ of the second motor 18.

(4) When anomalous friction increases in the first ball screw $BS_1$ and the second ball screw $BS_2$ are detected, the notification device 70 issues a notification about the increases. Accordingly, for example, the driver is urged to take some measure such as checking or repairing of the steering device 10.

Third Embodiment

A steering device according to a third embodiment will now be described. The present embodiment basically has the same configuration as the second embodiment, which is shown in FIGS. 1 and 3. Like or the same reference numerals are given to those components that are like or the same as the corresponding components of the second embodiment. Such components will not be described in detail.

In the determination process of step S108 in the flowchart of FIG. 4, the distribution calculation part 53 can determine that the friction of one of the first ball screw $BS_1$ and the second ball screw $BS_2$ has anomalously increased. However, in the determination process, identifying a ball screw of which the friction has increased is difficult. To solve the problem, in the present embodiment, a ball screw of which the friction has increased is identified as follows.

To facilitate understanding, for example, as represented by the following equation (B1), in step S101, the first distribution ratio $DR_1$ is hypothetically changed from 0.5 to 1 and the second distribution ratio $DR_2$ is hypothetically changed from 0.5 to 0. In this case, as represented by the following equation (B2), interchanging the first distribution ratio $DR_1$ and the second distribution ratio $DR_2$ in step S104 changes the first distribution ratio $DR_1$ from 1 to 0 and changes the second distribution ratio $DR_2$ from 0 to 1.

$$DR_1 : DR_2 = 1 : 0 \tag{B1}$$

$$DR_1 : DR_2 = 0 : 1 \tag{B2}$$

In step S108, when the following two conditions (C1) and (C2) are both satisfied, the distribution calculation part 53 determines that the friction of the second ball screw $BS_2$, which corresponds to the second motor 18, has anomalously increased.

(C1) The absolute value of the difference $\Delta I_\Sigma$ of the first total value $I_{\Sigma 1}$ prior to interchanging the distribution ratios and the second total value $I_{\Sigma 2}$ subsequent to interchanging the distribution ratios is out of the threshold value range $\Delta I_{th}$.

(C2) The second total value $I_{\Sigma 2}$ subsequent to interchanging the distribution ratios is larger than the first total value $I_{\Sigma 1}$ prior to interchanging the distribution ratios.

When the conditions (C1) and (C2) are both satisfied, the following situation hypothetically occurs. That is, an anomalous increase in the friction in the second ball screw $BS_2$ results in an anomalous increase in the load torque of the second motor 18, causing the current value $I_2$ of the second motor 18 to increase anomalously. Thus, the second total value $I_{\Sigma 2}$ subsequent to interchanging the distribution ratios hypothetically becomes larger than the first total value $I_{\Sigma 1}$ prior to interchanging the distribution ratios. When the friction of the first ball screw $BS_1$ and the friction of the second ball screw $BS_2$ are normal, the first total value $I_{\Sigma 1}$ prior to interchanging the distribution ratios and the second total value $I_{\Sigma 2}$ subsequent to interchanging the distribution ratios may be ideally the same.

Further, in step S108, when the following two conditions (D1) and (D2) are both satisfied, the distribution calculation part 53 determines that the friction of the first ball screw $BS_1$, which corresponds to the first motor 17, has anomalously increased.

(D1) The absolute value of the difference $\Delta I_\Sigma$ of the first total value $I_{\Sigma 1}$ prior to interchanging the distribution ratios and the second total value $I_{\Sigma 2}$ subsequent to interchanging the distribution ratios is out of the threshold value range $\Delta I_{th}$.

(D2) The second total value $I_{\Sigma 2}$ subsequent to interchanging the distribution ratios is smaller than the first total value $I_{\Sigma 1}$ prior to interchanging the distribution ratios.

When the conditions (D1) and (D2) are both satisfied, the following situation hypothetically occurs. That is, an anomalous increase in the friction in the first ball screw $BS_1$ results in an anomalous increase in the load torque of the first motor 17, causing the current value $I_1$ of the first motor 17 to increase anomalously. Thus, the second total value $I_{\Sigma 2}$ subsequent to interchanging the distribution ratios hypothetically becomes smaller than the first total value $I_{\Sigma 1}$ prior to interchanging the distribution ratios.

Advantages of Third Embodiment

Accordingly, the third embodiment has the following advantage in addition to the same advantages as advantages (1) and (2) of the first embodiment and advantages (3) and (4) of the second embodiment.

(5) Whether the friction of the first ball screw $BS_1$ or the second ball screw $BS_2$ has anomalously increased can be identified using the current value $I_1$ of the first motor 17 and the current value $I_2$ of the second motor 18.

Fourth Embodiment

A steering device according to a fourth embodiment will now be described. The present embodiment basically has the same configuration as the first embodiment, which is shown in FIG. 1. Like or the same reference numerals are given to those components that are like or the same as the corresponding components of the first embodiment. Such components will not be described in detail.

Figure 5:
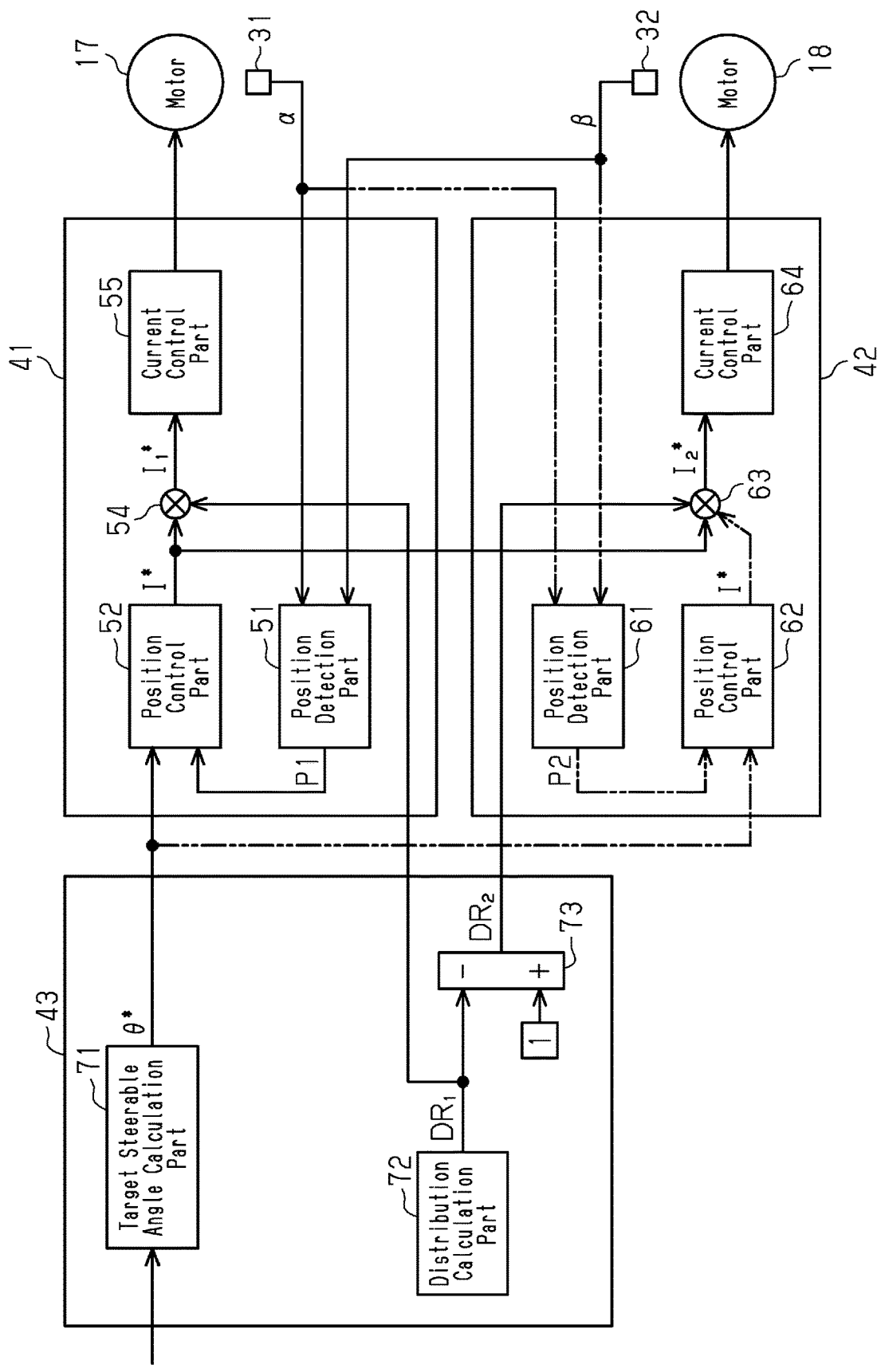
FIG. 5 is a block diagram of the controllers in a fourth embodiment.

As shown in FIG. 5, the first controller 41 does not include the distribution calculation part 53 or the subtractor 56. The upper controller 43, which is arranged outside of the first controller 41 and the second controller 42, includes a target steerable angle calculation part 71, which calculates the target steerable angle θ*. In addition, the upper controller 43 includes a distribution calculation part 72 and a subtractor 73. The target steerable angle calculation part 71 calculates the target steerable angle θ* using signals received from various types of onboard sensors.

In the same manner as the distribution calculation part 53 of the first embodiment, the distribution calculation part 72 calculates the first distribution ratio $DR_1$ of the current command value I* for the first motor 17.

The subtractor 73 receives 1, which is a fixed value stored in the storage device of the upper controller 43. The subtractor 73 subtracts the first distribution ratio $DR_1$, which is calculated by the distribution calculation part 72, from 1, which is a fixed value, to calculate the second distribution ratio $DR_2$ of the current command value I* for the second motor 18.

The multiplier 54 of the first controller 41 multiplies the first distribution ratio $DR_1$, which is calculated by the distribution calculation part 72, by the current command value I*, which is calculated by the position control part 52, to calculate the first current command value $I_1$* for the first motor 17. In the same manner as the first embodiment, the current control part 55 supplies the first motor 17 with the power corresponding to the first current command value $I_1$*, which is calculated by the multiplier 54.

The multiplier 63 of the second controller 42 multiplies the second distribution ratio $DR_2$, which is calculated by the subtractor 73 of the upper controller 43, by the current command value I* to calculate the second current command value $I_2$* for the second motor 18. In the same manner as the first embodiment, the current control part 64 supplies the second motor 18 with the power corresponding to the second current command value $I_2$*, which is calculated by the multiplier 63.

In the same manner as the third embodiment, the current value $I_1$ of the first motor 17 and the current value $I_2$ of the second motor 18 are used to detect anomalous friction increases that result from, for example, wear of the first ball screw $BS_1$ and the second ball screw $BS_2$. The distribution calculation part 72 uses a communication channel (not shown) to receive the current value $I_1$ of the first motor 17 and the current value $I_2$ of the second motor 18 from the first controller 41 and the second controller 42. For example, upon satisfaction of the above-described condition (A), the distribution calculation part 72 starts executing the anomaly detection process.

The fourth embodiment has the same operation and advantages as advantages (1) and (2) of the first embodiment, advantages (3) and (4) of the second embodiment, and advantage (5) of the third embodiment.

Fifth Embodiment

A steering device according to a fifth embodiment will now be described. The present embodiment basically has the same configuration as the first embodiment, which is shown in FIG. 1. Like or the same reference numerals are given to those components that are like or the same as the corresponding components of the first embodiment. Such components will not be described in detail.

Figure 6:
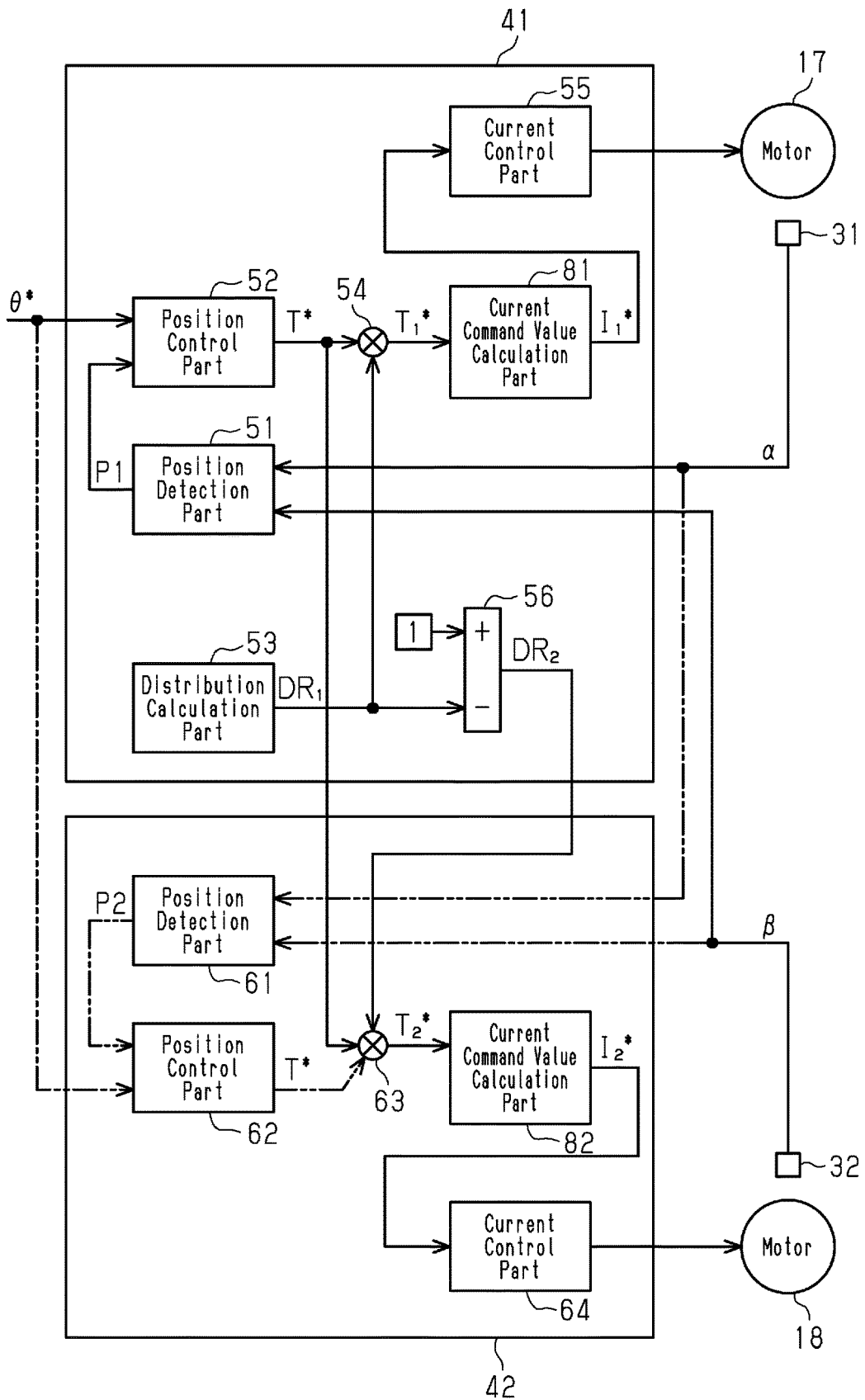
FIG. 6 is a block diagram of the controllers in a fifth embodiment.

As shown in FIG. 6, the first controller 41 includes a current command value calculation part 81 in addition to the position detection part 51, the position control part 52, the distribution calculation part 53, the multiplier 54, the current control part 55, and the subtractor 56.

In the same manner as the first embodiment, the position control part 52 obtains the difference between the target absolute position of the steering rod 12 and the actual absolute position P1 of the steering rod 12, which is calculated by the position detection part 51. The position control part 52 calculates a torque command value T* for the first motor 17 and the second motor 18 so as to eliminate the difference. The torque command value T* is a command value indicating the total torque that should be generated in the first motor 17 and the second motor 18.

The multiplier 54 multiplies the first distribution ratio $DR_1$, which is calculated by the distribution calculation part 53, by the torque command value T*, which is calculated by the position control part 52, to calculate a first torque command value $T_1$*, which is an individual command value for the first motor 17.

The current command value calculation part 81 calculates the first current command value $I_1$* by dividing the first torque command value $T_1$*, which is calculated by the multiplier 54, by a coefficient (torque constant) corresponding to a motor constant of the first motor 17.

In the same manner as the first embodiment, the current control part 55 supplies the first motor 17 with the power corresponding to the first current command value $I_1^*$, which is calculated by the current command value calculation part 81.

The second controller 42 includes a current command value calculation part 82 in addition to the position detection part 61, the position control part 62, the multiplier 63, and the current control part 64.

In the same manner as the position control part 52 of the first controller 41, the position control part 62 calculates the torque command value T*. The position control part 62 is used for a backup of the first controller 41, and the function of the position control part 62 is kept disabled in the normal state in which the first controller 41 is operating normally.

The multiplier 63 multiplies the second distribution ratio $DR_2$, which is calculated by the subtractor 56 of the first controller 41, by the torque command value T*, which is calculated by the position control part 52 of the first controller 41, to calculate a second torque command value $T_2^*$, which is an individual command value for the second motor 18.

The current command value calculation part 82 calculates the second current command value $I_2^*$ by dividing the second torque command value $T_2^*$, which is calculated by the multiplier 63, by a coefficient (torque constant) corresponding to a motor constant of the second motor 18.

In the same manner as the first embodiment, the current control part 64 supplies the second motor 18 with the power corresponding to the second current command value $I_2^*$, which is calculated by the current command value calculation part 82.

The fifth embodiment has the same operation and advantages as advantages (1) and (2) of the first embodiment.

Sixth Embodiment

A steering device according to a sixth embodiment will now be described. The present embodiment basically has the same configuration as the first embodiment, which is shown in FIG. 1. Like or the same reference numerals are given to those components that are like or the same as the corresponding components of the first embodiment. Such components will not be described in detail.

Figure 7:
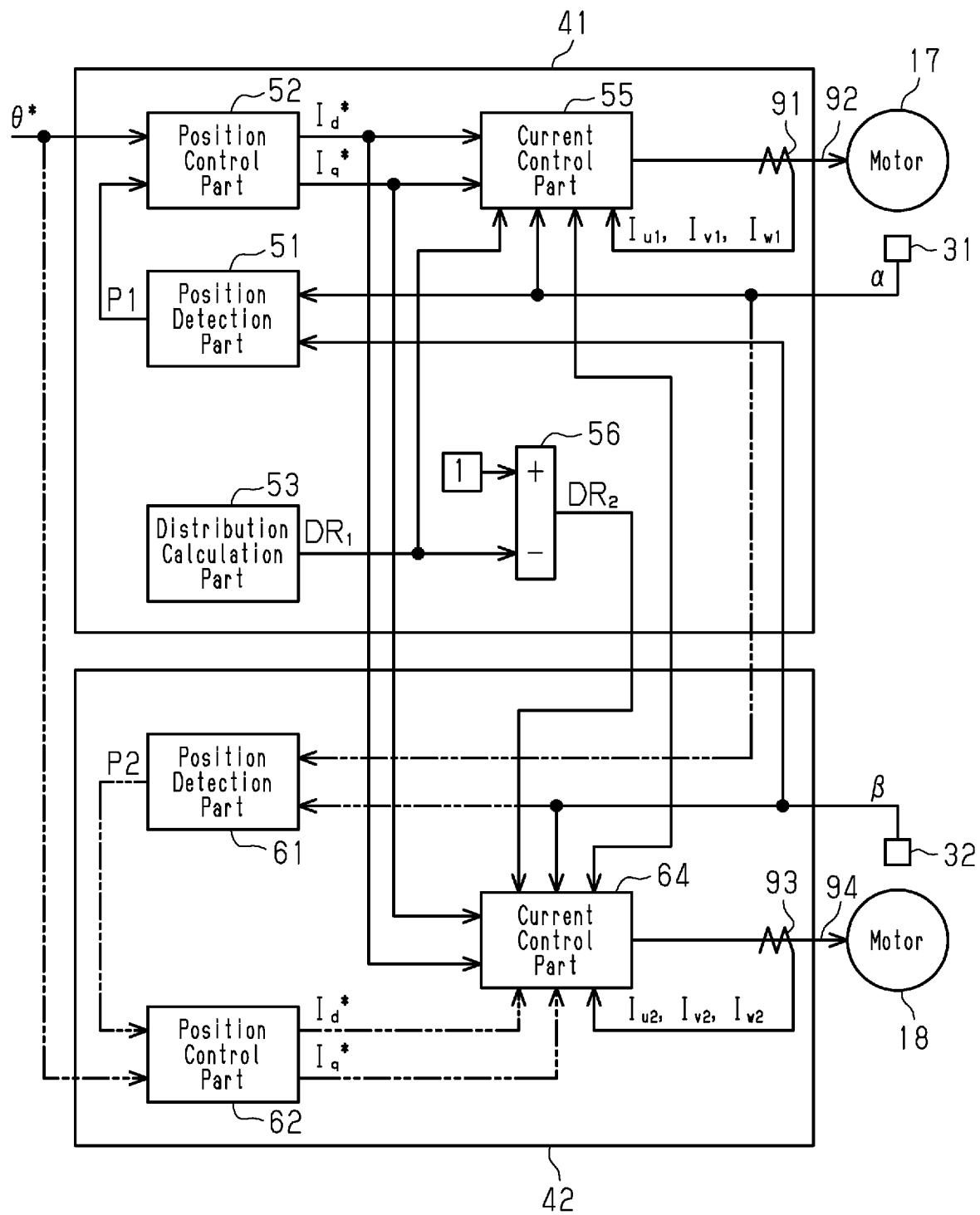
FIG. 7 is a block diagram of the controllers in a sixth embodiment.

As shown in FIG. 7, the first controller 41 includes a first current sensor 91 in addition to the position detection part 51, the position control part 52, the distribution calculation part 53, the current control part 55, and the subtractor 56. The first controller 41 of the present embodiment does not include the multiplier 54.

The position control part 52 calculates a d-axis current command value $I_d^*$ and a q-axis current command value $I_q^*$ in a dq coordinate system. The q-axis current command value $I_q^*$ is a command value corresponding to the total torque that should be generated in the first motor 17 and the second motor 18. The d-axis current command value $I_d^*$ is basically set to zero.

The first current sensor 91 is arranged on a power feeding passage 92 between the current control part 55 and the first motor 17. The first current sensor 91 detects current values $I_{u1}$, $I_{v1}$, and $I_{w1}$ of respective phases, which are the values of current supplied from the current control part 55 to the first motor 17. To facilitate understanding, one power feeding passage 92 represents the passages for the respective phases and one first current sensor 91 represents the sensors for the respective phases in FIG. 7.

The current control part 55 obtains the d-axis current command value $I_d^*$ and the q-axis current command value $I_q^*$, which are calculated by the position control part 52, the first distribution ratio $DR_1$, which is calculated by the distribution calculation part 53, and a second d-axis current value $I_{d2}$ and a second q-axis current value $I_{q2}$, which are calculated by the current control part 64 of the second controller 42 as described below. Further, the current control part 55 obtains the rotation angle α of the first motor 17, which is detected by the first rotation angle sensor 31, and the current values $I_{u1}$, $I_{v1}$, and $I_{w1}$, which are detected by the first current sensor 91. The current control part 55 supplies the first motor 17 with current by executing a current feedback control (hereinafter also referred to as "current FB control") in the dq coordinate system.

The second controller 42 includes a second current sensor 93 in addition to the position detection part 61, the position control part 62, and the current control part 64. The second controller 42 of the present embodiment does not include the multiplier 63.

In the same manner as the position control part 52 of the first controller 41, the position control part 62 calculates the d-axis current command value $I_d^*$ and the q-axis current command value $I_q^*$. The position control part 62 is used for a backup of the first controller 41, and the function of the position control part 62 is kept disabled in the normal state in which the first controller 41 is operating normally.

The second current sensor 93 is arranged on a power feeding passage 94 between the current control part 64 and the second motor 18. The second current sensor 93 detects current values $I_{u2}$, $I_{v2}$, and $I_{w2}$ of respective phases, which are the values of current supplied from the current control part 64 to the second motor 18. To facilitate understanding, one power feeding passage 94 represents the passages for the respective phases and one second current sensor 93 represents the sensors for the respective phases in FIG. 7.

The current control part 64 obtains the d-axis current command value $I_d^*$ and the q-axis current command value $I_q^*$, which are calculated by the position control part 52, the second distribution ratio $DR_2$, which is calculated by the subtractor 56, and a first d-axis current value $I_{d1}$ and a first q-axis current value Iq1, which are calculated by the current control part 55 of the first controller 41 as described below. Further, the current control part 64 obtains the rotation angle β of the second motor 18, which is detected by the second rotation angle sensor 32, and the current values $I_{u2}$, $I_{v2}$, and $I_{w2}$, which are detected by the second current sensor 93. Furthermore, the current control part 64 obtains the d-axis current command value $I_d^*$ and the q-axis current command value $I_q^*$, which are calculated by the position control part 62. The current control part 64 supplies the second motor 18 with current by executing the current F/B control in the dq coordinate system.

The current F/B control executed by the current control parts 55 and 64 will now be described. The current control parts 55 and 64 respectively supply the first motor 17 and the second motor 18 with current by executing calculation processes illustrated in the following control blocks in predetermined calculation cycles.

Figure 8:
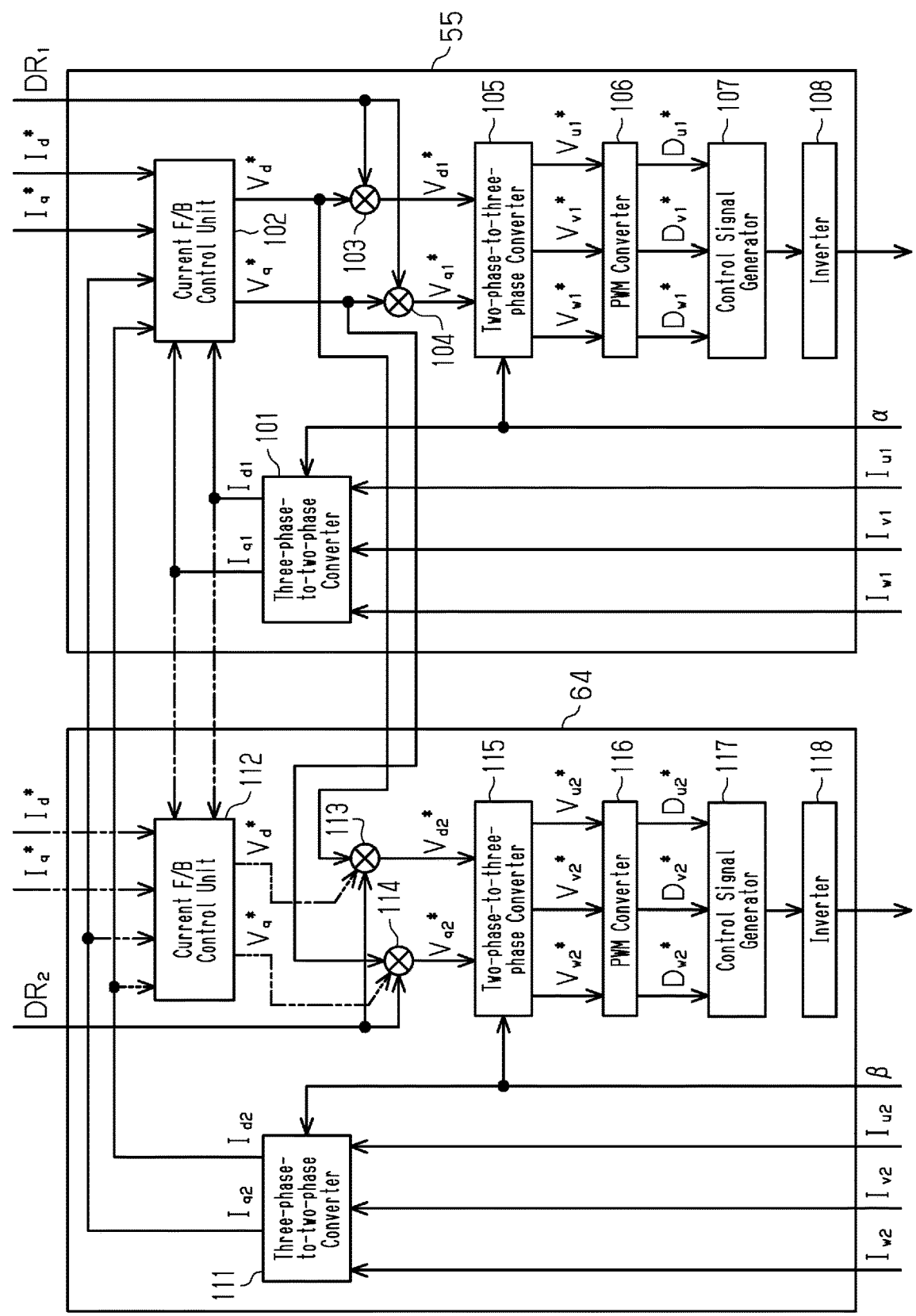
FIG. 8 is a block diagram of the current control parts in the sixth embodiment.

As shown in FIG. 8, the current control part 55 of the first controller 41 includes a first three-phase-to-two-phase converter 101, a first current F/B control unit 102, first multipliers 103 and 104, a first two-phase-to-three-phase converter 105, a first PWM converter 106, a first control signal generator 107, and a first inverter 108. The current control part 64 of the second controller 42 includes a second three-phase-to-two-phase converter 111, a second current F/B control unit 112, second multipliers 113 and 114, a second two-phase-to-three-phase converter 115, a second PWM converter 116, a second control signal generator 117, and a second inverter 118. The first inverter 108 and the second inverter 118 are known PWM inverters each including switching elements such as FETs.

The first three-phase-to-two-phase converter 101 obtains the current values $I_{u1}$, $I_{v1}$, and $I_{w1}$ of the respective phases and the rotation angle α. The first three-phase-to-two-phase converter 101 calculates the first d-axis current value $I_{d1}$ and the first q-axis current value $I_{q1}$ by mapping the current values $I_{u1}$, $I_{v1}$, and $I_{w1}$ of the respective phases onto the dq coordinates using the rotation angle α.

The second three-phase-to-two-phase converter 111 obtains the current values $I_{u2}$, $I_{v2}$, and $I_{w2}$ of the respective phases and the rotation angle β. The second three-phase-to-two-phase converter 111 calculates the second d-axis current value $I_{d2}$ and the second q-axis current value $I_{q2}$ by mapping the current values $I_{u2}$, $I_{v2}$, and $I_{w2}$ of the respective phases onto the dq coordinates using the rotation angle β.

The first current F/B control unit 102 obtains the d-axis current command value $I_d^*$ and the q-axis current command value $I_q^*$, which are calculated by the position control part 52, the first d-axis current value $I_{d1}$ and the first q-axis current value $I_{q1}$, which are calculated by the first three-phase-to-two-phase converter 101, and the second d-axis current value $I_{d2}$ and the second q-axis current value $I_{q2}$, which are calculated by the second three-phase-to-two-phase converter 111. The first current F/B control unit 102 adds the first d-axis current value $I_{d1}$ and the second d-axis current value $I_{d2}$ to calculate a d-axis current value $I_d$. The first current F/B control unit 102 adds the first q-axis current value $I_{q1}$ and the second q-axis current value $I_{q2}$ to calculate a q-axis current value $I_q$. The first current F/B control unit 102 calculates a d-axis voltage command value $V_d^*$ and a q-axis voltage command value $V_q^*$, which are command values, by executing a current F/B control calculation so that the d-axis current value $I_d$ follows the d-axis current command value $I_d^*$ and the q-axis current value $I_q$ follows the q-axis current command value $I_q^*$. The first current F/B control unit 102 executes a PID control calculation as an example of the current F/B control calculation.

The first multiplier 103 multiplies the first distribution ratio $DR_1$, which is calculated by the distribution calculation part 53, by the d-axis voltage command value $V_d^*$ to calculate a first d-axis voltage command value $V_{d1}^*$, which is an individual command value for the first motor 17. The first multiplier 104 multiplies the first distribution ratio $DR_1$ by the q-axis voltage command value $V_q^*$ to calculate a first q-axis voltage command value $V_{q1}^*$, which is an individual command value for the first motor 17.

In addition to the first d-axis voltage command value $V_{d1}^*$ and the first q-axis voltage command value $V_{q1}^*$, the first two-phase-to-three-phase converter 105 obtains the rotation angle α. The first two-phase-to-three-phase converter 105 calculates first voltage command values $V_{u1}^*$, $V_{v1}^*$, and $V_{w1}^*$ of three phases by mapping the first d-axis voltage command value $V_{d1}^*$ and the first q-axis voltage command value $V_{q1}^*$ onto three-phase alternate coordinates using the rotation angle α.

The first PWM converter 106 uses the first voltage command values $V_{u1}^*$, $V_{v1}^*$, and $V_{w1}^*$ to calculate first duty command values $D_{u1}^*$, $D_{v1}^*$, and $D_{w1}^*$. The first duty command values $D_{u1}^*$, $D_{v1}^*$, and $D_{w1}^*$ define the duty ratio of each switching element configuring the first inverter 108. The duty ratio refers to the ratio of the activation time of the switching element occupying a pulse cycle.

The first control signal generator 107 compares the first duty command values $D_{u1}^*$, $D_{v1}^*$, and $D_{w1}^*$ with PWM carriers, which are carrier waves such as triangular waves or sawtooth waves to generate a control signal including the duty ratio indicated by the first duty command values $D_{u1}^*$, $D_{v1}^*$, and $D_{w1}^*$. The first motor 17 is supplied with the power corresponding to the control signal by outputting the control signal calculated in this manner to the first inverter 108.

The second current FB control unit 112 obtains the d-axis current command value $I_d^*$ and the q-axis current command value $I_q^*$, which are calculated by the position control part 62, the first d-axis current value $I_{d1}$ and the first q-axis current value $I_{q1}$, which are calculated by the first three-phase-to-two-phase converter 101, and the second d-axis current value $I_{d2}$ and the second q-axis current value $I_{q2}$, which are calculated by the second three-phase-to-two-phase converter 111. In the same manner as the first current F/B control unit 102, the second current F/B control unit 112 calculates the d-axis voltage command value $V_d^*$ and the q-axis voltage command value $V_q^*$, which are command values.

The second multiplier 113 multiplies the second distribution ratio $DR_2$, which is calculated by the subtractor 56 of the first controller 41, by the d-axis voltage command value $V_d^*$ to calculate a second d-axis voltage command value $V_{d2}^*$, which is an individual command value for the second motor 18. The second multiplier 114 multiplies the second distribution ratio $DR_2$ by the q-axis voltage command value $V_q^*$ to calculate a second q-axis voltage command value $V_{q2}^*$, which is an individual command value for the second motor 18.

In addition to the second q-axis voltage command value $V_{d2}^*$ and the second q-axis voltage command value $V_{q2}^*$, the second two-phase-to-three-phase converter 115 obtains the rotation angle β. The second two-phase-to-three-phase converter 115 calculates second voltage command values $V_{u2}^*$, $V_{v2}^*$, and $V_{w2}^*$ of three phases by mapping the second q-axis voltage command value $V_{q2}^*$ and the second q-axis voltage command value $Vq_2^*$ onto three-phase alternate coordinates using the rotation angle β.

The second PWM converter 116 uses the second voltage command values $V_{u2}^*$, $V_{v2}^*$, and $V_{w2}^*$ to calculate second duty command values $D_{u2}^*$, $D_{v2}^*$, and $D_{w2}^*$. The second duty command values $D_{u2}^*$, $D_{v2}^*$, and $D_{w2}^*$ define the duty ratio of each switching element configuring the second inverter 118.

In the same manner as the first control signal generator 107, the second control signal generator 117 generates a control signal including the duty ratio indicated by the second duty command values $D_{u2}^*$, $D_{v2}^*$, and $D_{w2}^*$. The second motor 18 is supplied with the power corresponding to the control signal by outputting the control signal calculated in this manner to the second inverter 118.

The sixth embodiment has the same operation and advantages as advantages (1) and (2) of the first embodiment.

Modifications

The first to sixth embodiments may be modified as follows.

In the sixth embodiment, the voltage command value is divided into individual command values that respectively correspond to the first motor 17 and the second motor 18. Instead, for example, the duty command values may be divided into individual command values that respectively correspond to the first motor 17 and the second motor 18.

In the first to fifth embodiments, the first motor 17 and the second motor 18 may be supplied with current by executing a current feedback control in the dq coordinate system.

In the fourth embodiment, in the same manner as the second embodiment, the distribution calculation part 72 may detect only an anomalous increase in the friction of one of the first ball screw $BS_1$ and the second ball screw $BS_2$ and does not have to identify a ball screw where the friction increases. Further, the distribution calculation part 72 does not have to detect an anomalous friction increase in the first ball screw $BS_1$ or the second ball screw $BS_2$.

In the fifth and sixth embodiments, in the same manner as the second or third embodiment, the distribution calculation part 53 may detect an anomalous friction increase that results from, for example, wear of the first ball screw $BS_1$ and the second ball screw $BS_2$ using the current value $I_1$ of the first motor 17 and the current value $I_2$ of the second motor 18.

In the third embodiment, when an anomalous increase in the friction of one of the first ball screw $BS_1$ and the second ball screw $BS_2$ has been detected, the driving of the motor corresponding to the ball screw where the anomaly has been detected may be stopped. Additionally, when an anomalous increase in the friction of one of the first ball screw $BS_1$ or the second ball screw $BS_2$ has been detected, the current supplied to the motor may be set to be smaller than the current that should be originally supplied. That is, the current supplied to the motor corresponding to the ball screw where the anomaly has been detected is set to be smaller than the current supplied to the motor corresponding to a normal ball screw. The distribution calculation part 53 transmits, to the current control part 55 or 64 of the controller corresponding to the ball screw where the anomaly has been detected, a command for stopping or limiting the power feeding to the motor. This protects the ball screw of which the friction has been anomalously increased. Further, the life of the ball screw of which the friction has been anomalously increased is extended.

In the second and third embodiments, the distribution calculation part 53 of the first controller 41 has the anomaly detection function to detect anomalous friction increases in the first ball screw $BS_1$ and the second ball screw $BS_2$. Instead, a dedicated anomaly detection part including the anomaly detection function may be arranged separately from the distribution calculation part 53.

In this configuration, when the execution condition of the anomaly determination process is satisfied, the anomaly detection part sends a command for changing the distribution ratios to the distribution calculation part 53. Then, the anomaly detection part detects anomalous friction increases in the first ball screw $BS_1$ and the second ball screw $BS_2$ using the current value $I_1$ of the first motor 17 and the current value $I_2$ of the second motor 18 in accordance with the flowchart of FIG. 4. When anomalies in the first ball screw $BS_1$ and the second ball screw $BS_2$ are detected, the anomaly detection part generates the notification command signal Sw for the notification device 70.

In the second and third embodiments, the anomaly determination condition is that the absolute value of the difference $\Delta I_\Sigma$ between the first total value $I_{\Sigma 1}$ prior to interchanging the distribution ratios and the second total value $I_{\Sigma 2}$ subsequent to interchanging the distribution ratios is out of the threshold value range $\Delta I_{th}$. Instead, anomalies in the first ball screw $BS_1$ and the second ball screw $BS_2$ may be determined as follows. That is, the distribution calculation part 53 of the first controller 41 executes the processes of steps S101 to step S106 in the flowchart of FIG. 4 to calculate the first total value $I_{\Sigma 1}$ prior to interchanging the distribution ratios and the second total value $I_{\Sigma 2}$ subsequent to interchanging the distribution ratios. When the first total value $I_{\Sigma 1}$ and the second total value $I_{\Sigma 2}$ differ from each other, the distribution calculation part 53 determines that the friction of one of the first ball screw $BS_1$ and the second ball screw $BS_2$ has anomalously increased.

In the first to sixth embodiments, the first ball screw part 12a may be a left-hand thread and the second ball screw part 12b may be a right-hand thread. That is, the first ball screw part 12a and the second ball screw part 12b simply need to have the relationship of a reverse screw. Alternatively, both of the first ball screw part 12a and the second ball screw part 12b may be right-hand threads or left-hand threads. When this structure is employed, the steering rod 12 is provided with a rotation restriction portion that restricts the rotation of the steering rod 12 relative to the housing 11.

In the first to sixth embodiments, when the steering rod 12 is provided with the rotation restriction portion, the first controller 41 may set the first distribution ratio $DR_1$ and the second distribution ratio $DR_2$ to an uneven distribution ratio even when the vehicle is traveling normally regardless of whether the execution condition of the anomaly detection process is satisfied. The control modes of the first motor 17 and the second motor 18 may be provided flexibly in correspondence with product specifications or the travel state of the vehicle. Further, in this configuration, the processes of the flowchart in FIG. 4 may be executed without determining whether the above-described execution condition (A) of the anomaly detection process is satisfied.

In the first to sixth embodiments, instead of the target steerable angle $\theta^*$, the onboard upper controller 43 may calculate the target absolute position of the steering rod 12 corresponding to the steering state or traveling state of the vehicle. In this case, the first controller 41 and the second controller 42 obtain the target absolute position of the steering rod 12, which is calculated by the upper controller 43. The first controller 41 and the second controller 42 use the target absolute position to control the power feeding to the first motor 17 and the second motor 18.

In the first to sixth embodiments, the first transmission mechanism that transmits the drive force of the first motor 17 to the steering rod 12 does not have to include the first belt transmission mechanism 21. The second transmission mechanism that transmits the drive force of the second motor 18 to the steering rod 12 does not have to include the second belt transmission mechanism 22. In this case, for example, the first motor 17 and the second motor 18 are arranged coaxially with the steering rod 12. The output shaft 17a of the first motor 17 is coupled to the first ball nut 15 such that the output shaft 17a and the first ball nut 15 rotate integrally, and the output shaft 18a of the second motor 18 is coupled to the second ball nut 16 such that the output shaft 17b and the second ball nut 16 rotate integrally. Even this structure has the same advantages as the first to sixth embodiments.

Figure 9:
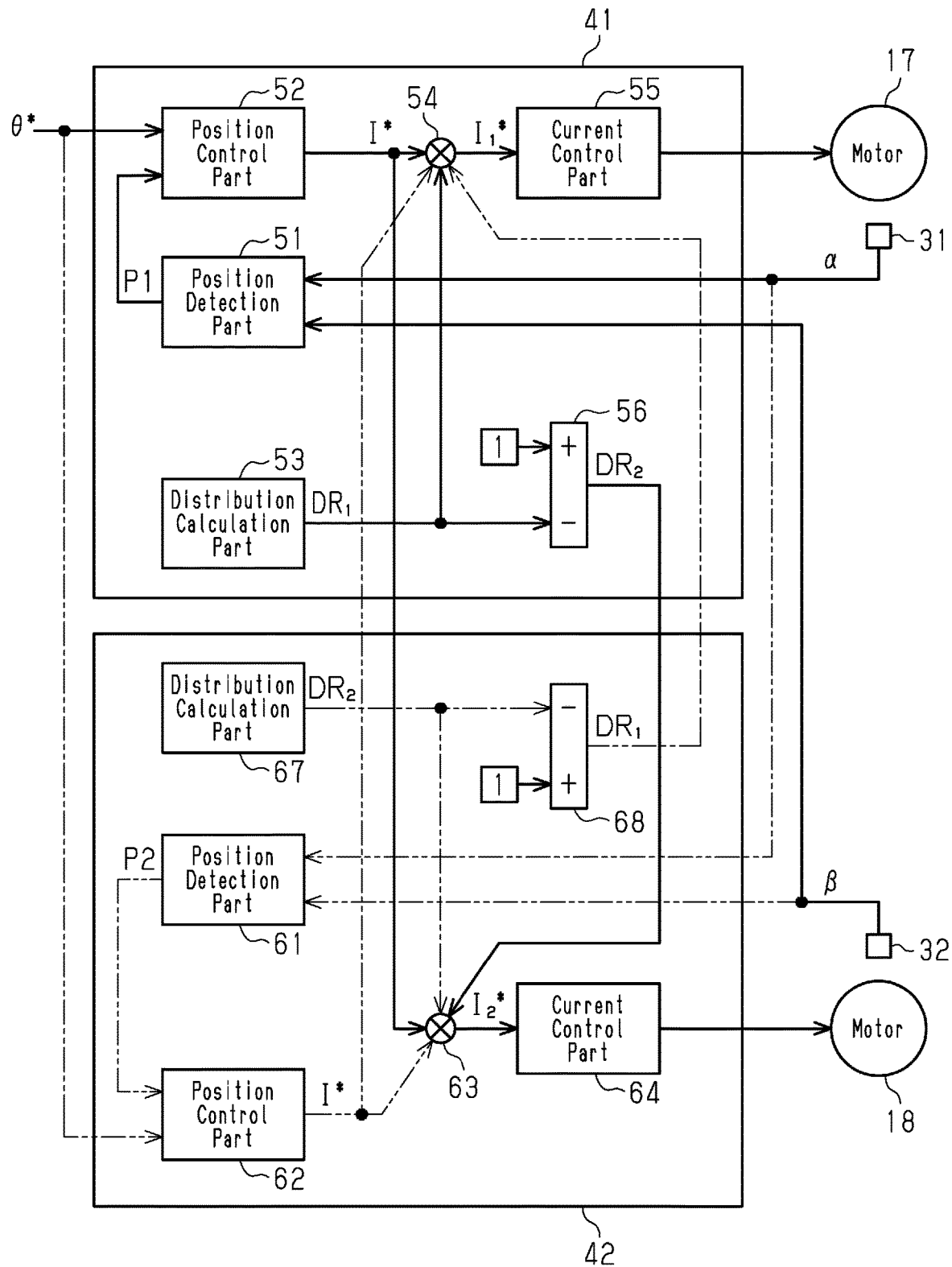
FIG. 9 is a block diagram of the controllers in a modification.

As shown in FIG. 9, in the first to third, fifth, and sixth embodiments, the second controller 42 may also include a distribution calculation part 67 and a subtractor 68 like the first controller 41. This allows the second controller 42 to have the same configuration as the first controller 41 and serve as a backup device for the first controller 41. The distribution calculation part 67 calculates the second distribution ratio $DR_2$ of the current command value I* for the second motor 18, which is calculated by the position control part 62. The subtractor 68 receives 1, which is a fixed value stored in a storage device of the second controller 42. The subtractor 68 subtracts the second distribution ratio $DR_2$, which is calculated by the distribution calculation part 67, from 1, which is a fixed value, to calculate the first distribution ratio $DR_1$ of the current command value I* for the first motor 17. The distribution calculation part 67 and the subtractor 68 are used for backups of the first controller 41, and their functions are kept disabled when the first controller 41 is operating normally.

In the first to sixth embodiments, the second controller 42 does not have to include the position detection part 61 or the position control part 62. This simplifies the configuration of the second controller 42.

The steering device 10 of the first to sixth embodiments may be applied to a by-wire steering system in which the transmission of power between a steerable wheel and steerable wheels is separated. The by-wire steering system includes a reaction force motor, which is the generation source of a steering reaction force applied to the steering shaft, and a reaction force controller, which controls the driving of the reaction force motor. The reaction force controller, for example, calculates a target steering angle of the steering wheel using the steering state or traveling state of the vehicle. In this case, the first controller 41 and the second controller 42 obtain, as the target steerable angle $\theta^*$, the target steering angle calculated by the reaction force controller serving as the upper controller.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A steering device comprising:
    two motors each configured to generate a drive force that steers a steerable wheel of a vehicle; and
    two controllers respectively corresponding to the two motors, each of the two controllers being configured to individually control a corresponding one of the motors, wherein
    one of the two controllers is a first controller and the other one of the two controllers is a second controller,
    the first controller is configured to calculate a command value corresponding to a total torque that should be generated in the two motors,
    the command value is divided into individual command values using a changeable distribution ratio set for each of the motors, the individual command values respectively corresponding to the motors,
    the two controllers are configured to respectively supply the motors with current corresponding to the individual command values, and
    the steering device further comprises:
        a steering rod configured to steer the steerable wheel; and
        two transmission mechanisms each configured to individually transmit the drive force of a corresponding one of the two motors to the steering rod, wherein
    when an execution condition that has been preset for an anomaly detection process is satisfied, the first controller is configured to:
        set the distribution ratios of the command value to an uneven distribution ratio;
        interchange the set distribution ratios between the two motors; and
        detect an anomalous increase in friction of the transmission mechanisms by comparing a total value of current in the two motors prior to interchanging the distribution ratios with a total value of current in the two motors subsequent to interchanging the distribution ratios.

2. The steering device according to claim 1, wherein the distribution ratios of the command value are set by the first controller.

3. The steering device according to claim 1, wherein the first controller is configured to:
    calculate a first total value that is the total value of current in the two motors prior to interchanging the distribution ratios;
    calculate a second total value that is the total value of current in the two motors subsequent to interchanging the distribution ratios;
    calculate an absolute value of a difference between the first total value and the second total value; and
    when the absolute value of the difference is out of a threshold value range that has been preset in order to detect an anomalous increase in the friction of the transmission mechanisms, determine that the friction of one of the two transmission mechanisms has anomalously increased.

4. The steering device according to claim 3, wherein
    a motor of the two motors that corresponds to the first controller is a first motor and a motor of the two motors that corresponds to the second controller is a second motor,
    a distribution ratio of the distribution ratios that corresponds to the first motor is a first distribution ratio and a distribution ratio of the distribution ratios that corresponds to the second motor is a second distribution ratio,
    when the execution condition is satisfied, the first controller is configured to set the first distribution ratio for the first motor to be smaller than the second distribution ratio for the second motor subsequent to interchanging the distribution ratios, and
    the first controller is configured to determine that the friction of the transmission mechanism corresponding to the second motor has anomalously increased when the absolute value of the difference is out of the threshold value range and the second total value is larger than the first total value.

5. The steering device according to claim 4, wherein when an anomaly is detected in one of the two transmission mechanisms, the first controller is configured to cause the motor corresponding to the transmission mechanism where the anomaly is detected to stop being driven or set a current supplied to the motor corresponding to the transmission mechanism where the anomaly is detected to be smaller than a current supplied the motor corresponding to a normal one of the transmission mechanisms.

6. The steering device according to claim 3, wherein
    a motor of the two motors that corresponds to the first controller is a first motor and a motor of the two motors that corresponds to the second controller is a second motor, a distribution ratio of the distribution ratios that corresponds to the first motor is a first distribution ratio and a distribution ratio of the distribution ratios that corresponds to the second motor is a second distribution ratio, when the execution condition is satisfied, the first controller is configured to set the first distribution ratio for the first motor to be smaller than the second distribution ratio for the second motor subsequent to interchanging the distribution ratios, and the first controller is configured to determine that the friction of the transmission mechanism corresponding to the first motor has anomalously increased when the absolute value of the difference is out of the threshold value range and the second total value is smaller than the first total value.

7. The steering device according to claim 6, wherein when an anomaly is detected in one of the two transmission mechanisms, the first controller is configured to cause the motor corresponding to the transmission mechanism where the anomaly is detected to stop being driven or set a current supplied to the motor corresponding to the transmission mechanism where the anomaly is detected to be smaller than a current supplied the motor corresponding to a normal one of the transmission mechanisms.

8. The steering device according to claim 1, wherein
one of the two transmission mechanisms is a first transmission mechanism that includes a first ball nut fastened to a first ball screw part on the steering rod, and
the other one of the two transmission mechanisms is a second transmission mechanism that includes a second ball nut fastened to a second ball screw part on the steering rod.

9. The steering device according to claim 8, wherein the first ball screw part and the second ball screw part have a relationship of a reverse screw.

10. The steering device according to claim 1, wherein the distribution ratios of the command value are set by an external controller arranged outside of the two controllers.

11. The steering device according to claim 1, wherein the command value is a torque command value indicating the total torque that should be generated in the two motors.

12. The steering device according to claim 1, wherein the command value is a current command value corresponding to the total torque that should be generated in the two motors.

13. The steering device according to claim 1, wherein the command value is a voltage command value corresponding to the total torque that should be generated in the two motors.

14. A steering device comprising:
two motors each configured to generate a drive force that steers a steerable wheel of a vehicle; and
two controllers respectively corresponding to the two motors, each of the two controllers being configured to individually control a corresponding one of the motors, wherein
one of the two controllers is a first controller and the other one of the two controllers is a second controller,
the first controller is configured to calculate a command value corresponding to a total torque that should be generated in the two motors,
the command value is divided into individual command values using a changeable distribution ratio set for each of the motors, the individual command values respectively corresponding to the motors,
the two controllers are configured to respectively supply the motors with current corresponding to the individual command values, and
the steering device further comprising:
a steering rod configured to steer the steerable wheel;
two transmission mechanisms each configured to individually transmit the drive force of a corresponding one of the two motors to the steering rod; and
an external controller arranged outside of the two controllers, wherein
when an execution condition that has been preset for an anomaly detection process is satisfied, the external controller is configured to:
set the distribution ratios of the command value to an uneven distribution ratio;
interchange the set distribution ratios between the two motors; and
detect an anomalous increase in friction of the transmission mechanisms by comparing a total value of current in the two motors prior to interchanging the distribution ratios with a total value of current in the two motors subsequent to interchanging the distribution ratios.

15. A steering method for individually controlling two motors each configured to generate a drive force that steers a steerable wheel of a vehicle, the steerable wheel being coupled to a steering rod, the steering rod being coupled to two transmission mechanisms each configured to individually transmit the drive force of a corresponding one of the two motors to the steering rod, and the steering method comprising:
calculating a command value corresponding to a total torque that should be generated in the two motors;
dividing the command value into individual command values using a changeable distribution ratio set for each of the motors, the individual command values respectively corresponding to the motors;
respectively supplying the motors with current corresponding to the individual command value; and
when an execution condition that has been preset for an anomaly detection process is satisfied,
setting the distribution ratios of the command value to an uneven distribution ratio;
interchanging the set distribution ratios between the two motors; and
detecting an anomalous increase in friction of the transmission mechanisms by comparing a total value of current in the two motors prior to interchanging the distribution ratios with a total value of current in the two motors subsequent to interchanging the distribution ratios.

* * * * *